US012626673B2

(12) United States Patent
Yamada et al.

(10) Patent No.: US 12,626,673 B2
(45) Date of Patent: *May 12, 2026

(54) DISPLAY DATA GENERATION DEVICE, DISPLAY DATA GENERATION METHOD, AND DISPLAY DATA GENERATION PROGRAM

(71) Applicant: NTT, INC.

(72) Inventors: Setsuo Yamada, Tokyo (JP); Takaaki Hasegawa, Tokyo (JP); Kazuyuki Iso, Tokyo (JP); Masayuki Sugizaki, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/028,529

(22) Filed: Jan. 17, 2025

(65) Prior Publication Data

US 2025/0166584 A1 May 22, 2025

Related U.S. Application Data

(63) Continuation of application No. 18/552,865, filed as application No. PCT/JP2021/013692 on Mar. 30, 2021, now Pat. No. 12,230,231.

(51) Int. Cl.
G09G 5/02 (2006.01)
G06F 40/103 (2020.01)

(52) U.S. Cl.
CPC ............. G09G 5/02 (2013.01); G06F 40/103 (2020.01)

(58) Field of Classification Search
CPC ....... G06F 9/453; G06F 3/04897; G09G 5/00; G09G 2320/0606; G09G 2320/0666; G09G 2320/08; G09G 5/02
See application file for complete search history.

(56) References Cited

U.S. PATENT DOCUMENTS 6,138,130 A 10/2000 Adler et al.
6,335,738 B1 1/2002 Englefield et al.
(Continued)

FOREIGN PATENT DOCUMENTS

JP 2006216022 A 8/2006
JP 2011008355 A 1/2011
WO 2016056402 A1 4/2016

OTHER PUBLICATIONS

Hasegawa et al. (2019) "Automatic knowledge support system that supports operator response" NTT Media Intelligence Laboratories, NTT Technical Journal Jul. 2019, pp. 16-19.

*Primary Examiner* — Olga V Merkoulova

(57) ABSTRACT

A display data generation device includes an input unit that receives input of target data including a text sequence and annotation information corresponding to texts included in the text sequence, and a display preparation unit that determines, on the basis of the annotation information, annotation expression information indicating a background color of a display screen of a display device and a position and a range in which a corresponding background color is displayed for expressing correspondence relationship between the texts and the annotation information in a case where the display device displays the texts, and generates display data for causing the text sequence and the annotation information to be displayed according to a sequence in the text sequence, the display data being for causing the background color indicated by the annotation expression information to be displayed at the position and the range indicated by the annotation expression information.

17 Claims, 24 Drawing Sheets

| UTTERANCE ID | SPEAKER INFORMATION | UTTERANCE TEXT | ANNOTATION INFORMATION (TOPIC) |
|---|---|---|---|
| 1 | OPERATOR | I AM BB FROM AA INSURANCE. IS MR. OR MS. CC AT HOME? | |
| 2 | CUSTOMER | YES. I AM CC. | OPENING |
| 3 | OPERATOR | I AM CALLING YOU REGARDING THE CAR ACCIDENT, SO DO YOU HAVE A MOMENT? | |
| 4 | CUSTOMER | YES. I DO. | |
| 5 | OPERATOR | SO, LET ME CONFIRM THE SITUATION REGARDING THE ACCIDENT. | |
| 6 | OPERATOR | I WAS TOLD THAT THE ACCIDENT HAPPENED IN A PARKING LOT, SO COULD YOU TELL ME WHAT KIND OF SITUATION YOUR CAR IS IN? | ACCIDENT SITUATION |
| 7 | CUSTOMER | THE REAR BUMPER HIT AGAINST A WALL AND CAME OFF, AND I WAS SHOCKED. | |
| 8 | OPERATOR | I AM SORRY TO HEAR THAT. I AM WORRIED ABOUT YOUR BODY. ARE YOU OKAY? | |
| 9 | CUSTOMER | YES. I AM OKAY. | INJURY SITUATION |
| 10 | OPERATOR | THAT IS GOOD TO HEAR. | |
| 11 | CUSTOMER | I DID NOT HAVE ANY SHOCK. | |
| 12 | OPERATOR | SO, HAVE YOU SENT YOUR CAR FOR REPAIR ALREADY? | REPAIR SITUATION |

(56) References Cited

U.S. PATENT DOCUMENTS

| | | | |
|---|---|---|---|
| 7,062,751 B2 | 6/2006 | Miyazaki et al. | |
| 7,669,125 B2 * | 2/2010 | Smirnov | G06F 3/0481 |
| | | | 715/708 |
| 9,891,814 B2 * | 2/2018 | Takaoka | G06F 3/048 |
| 10,019,428 B2 | 7/2018 | Nayar et al. | |
| 10,606,618 B2 * | 3/2020 | Lubow | G06F 9/453 |
| 10,936,799 B2 * | 3/2021 | Dorner | G06Q 50/01 |
| 11,361,566 B2 * | 6/2022 | Collinson | G06F 7/50 |
| 12,230,231 B2 * | 2/2025 | Yamada | G06F 40/169 |
| 2024/0194165 A1 | 6/2024 | Yamada et al. | |

* cited by examiner

FIG. 2

| UTTERANCE ID | SPEAKER INFORMATION | UTTERANCE TEXT | ANNOTATION INFORMATION (TOPIC) |
|---|---|---|---|
| 1 | OPERATOR | I AM BB FROM AA INSURANCE. IS MR. OR MS. CC AT HOME? | OPENING |
| 2 | CUSTOMER | YES, I AM CC. | OPENING |
| 3 | OPERATOR | I AM CALLING YOU REGARDING THE CAR ACCIDENT, SO DO YOU HAVE A MOMENT? | OPENING |
| 4 | CUSTOMER | YES, I DO. | OPENING |
| 5 | OPERATOR | SO, LET ME CONFIRM THE SITUATION REGARDING THE ACCIDENT. | OPENING |
| 6 | OPERATOR | I WAS TOLD THAT THE ACCIDENT HAPPENED IN A PARKING LOT, SO COULD YOU TELL ME WHAT KIND OF SITUATION YOUR CAR IS IN? | ACCIDENT SITUATION |
| 7 | CUSTOMER | THE REAR BUMPER HIT AGAINST A WALL AND CAME OFF, AND I WAS SHOCKED. | ACCIDENT SITUATION |
| 8 | OPERATOR | I AM SORRY TO HEAR THAT. I AM WORRIED ABOUT YOUR BODY. ARE YOU OKAY? | INJURY SITUATION |
| 9 | CUSTOMER | YES, I AM OKAY. | INJURY SITUATION |
| 10 | OPERATOR | THAT IS GOOD TO HEAR. | INJURY SITUATION |
| 11 | CUSTOMER | THE SHOCK WAS NOT SO BIG. | INJURY SITUATION |
| 12 | OPERATOR | SO, HAVE YOU SENT YOUR CAR FOR REPAIR ALREADY? | REPAIR SITUATION |

*FIG. 3*

| ANNOTATION INFORMATION (TOPIC) | COLOR |
|---|---|
| OPENING | GRAY |
| ACCIDENT SITUATION | GREEN |
| INJURY SITUATION | BLUE |
| REPAIR SITUATION | ORANGE |

FIG. 4

| DETERMINATION UNIT ID | SPEAKER INFORMATION | UTTERANCE TEXT | ANNOTATION INFORMATION (TOPIC) | ANNOTATION EXPRESSION INFORMATION |
|---|---|---|---|---|
| 1 | OPERATOR | I AM BB FROM AA INSURANCE. | OPENING | GRAY |
| 2 | OPERATOR | IS MR. OR MS. CC AT HOME? | | |
| 3 | CUSTOMER | YES. I AM CC. | | |
| 4 | OPERATOR | I AM CALLING YOU REGARDING THE CAR ACCIDENT, SO DO YOU HAVE A MOMENT? | | |
| 5 | CUSTOMER | YES. I DO. | | |
| 6 | OPERATOR | SO, LET ME CONFIRM THE SITUATION REGARDING THE ACCIDENT. | | |
| 7 | OPERATOR | I WAS TOLD THAT THE ACCIDENT HAPPENED IN A PARKING LOT, SO COULD YOU TELL ME WHAT KIND OF SITUATION YOUR CAR IS IN? | ACCIDENT SITUATION | GREEN |
| 8 | CUSTOMER | THE REAR BUMPER HIT AGAINST A WALL AND CAME OFF, AND I WAS SHOCKED. | | |
| 9 | OPERATOR | I AM SORRY TO HEAR THAT. | INJURY SITUATION | BLUE |
| 10 | OPERATOR | I AM WORRIED ABOUT YOUR BODY. | | |
| 11 | OPERATOR | ARE YOU OKAY? | | |
| 12 | CUSTOMER | YES. I AM OKAY. | | |
| 13 | OPERATOR | THAT IS GOOD TO HEAR. | | |
| 14 | CUSTOMER | THE SHOCK WAS NOT SO BIG. | | |
| 15 | OPERATOR | SO, HAVE YOU SENT YOUR CAR FOR REPAIR ALREADY? | REPAIR SITUATION | ORANGE |

FIG. 5

| UTTERANCE ID | SPEAKER INFORMATION | UTTERANCE TEXT | ANNOTATION INFORMATION (TOPIC) |
|---|---|---|---|
| 1 | OPERATOR | I AM BB FROM AA INSURANCE. | |
| | | IS MR. OR MS. CC AT HOME? | OPENING |
| 2 | CUSTOMER | YES, I AM CC. | |
| 3 | OPERATOR | I AM CALLING YOU REGARDING THE CAR ACCIDENT, SO DO YOU HAVE A MOMENT? | |
| 4 | CUSTOMER | YES, I DO. | |
| 5 | OPERATOR | SO, LET ME CONFIRM THE SITUATION REGARDING THE ACCIDENT. | |
| 6 | OPERATOR | I WAS TOLD THAT THE ACCIDENT HAPPENED IN A PARKING LOT. SO COULD YOU TELL ME WHAT KIND OF SITUATION YOUR CAR IS IN? | ACCIDENT SITUATION |
| 7 | CUSTOMER | THE REAR BUMPER HIT AGAINST A WALL AND CAME OFF, AND I WAS SHOCKED. | |
| 8 | OPERATOR | I AM SORRY TO HEAR THAT. | |
| | | I AM WORRIED ABOUT YOUR BODY. | |
| | | ARE YOU OKAY? | INJURY SITUATION |
| 9 | CUSTOMER | YES. I AM OKAY. | |
| 10 | OPERATOR | THAT IS GOOD TO HEAR. | |
| 11 | CUSTOMER | I DID NOT HAVE ANY SHOCK. | |
| 12 | OPERATOR | SO, HAVE YOU SENT YOUR CAR FOR REPAIR ALREADY? | REPAIR SITUATION |

*FIG. 8*

| CONDITION OF UTTERANCE INCLUDED IN UTTERANCE TEXT GROUP | RULE |
|---|---|
| FIRST UTTERANCE TEXT IN TARGET DATA IS INCLUDED<br>LAST UTTERANCE TEXT IN TARGET DATA IS NOT INCLUDED | GRADATIONS IN WHICH COLOR CONTINUOUSLY CHANGES FROM COLOR CORRESPONDING TO TOPIC TO WHITE FROM START POINT TOWARD END POINT |
| FIRST UTTERANCE TEXT IN TARGET DATA IS NOT INCLUDED<br>LAST UTTERANCE TEXT IN TARGET DATA IS NOT INCLUDED | GRADATIONS IN WHICH COLOR CONTINUOUSLY CHANGES FROM WHITE TO COLOR CORRESPONDING TO TOPIC FROM START POINT TOWARD MIDDLE POINT AND CONTINUOUSLY CHANGES FROM COLOR CORRESPONDING TO TOPIC TO WHITE FROM MIDDLE POINT TOWARD END POINT |
| FIRST UTTERANCE TEXT IN TARGET DATA IS NOT INCLUDED<br>LAST UTTERANCE TEXT IN TARGET DATA IS INCLUDED | GRADATIONS IN WHICH COLOR CONTINUOUSLY CHANGES FROM WHITE TO COLOR CORRESPONDING TO TOPIC FROM START POINT TOWARD END POINT |
| FIRST UTTERANCE TEXT IN TARGET DATA IS INCLUDED<br>LAST UTTERANCE TEXT IN TARGET DATA IS INCLUDED | NO GRADATIONS |

FIG. 9

| DETERMINATION UNIT ID | SPEAKER INFORMATION | UTTERANCE TEXT | ANNOTATION INFORMATION (TOPIC) | ANNOTATION EXPRESSION INFORMATION |
|---|---|---|---|---|
| 1 | OPERATOR | I AM BB FROM AA INSURANCE. | | |
| 2 | OPERATOR | IS MR. OR MS. CC AT HOME? | | |
| 3 | CUSTOMER | YES, I AM CC. | OPENING | GRADATIONS FROM GRAY TO WHITE |
| 4 | OPERATOR | I AM CALLING YOU REGARDING THE CAR ACCIDENT, SO DO YOU HAVE A MOMENT? | | |
| 5 | CUSTOMER | YES. I DO. | | |
| 6 | OPERATOR | SO, LET ME CONFIRM THE SITUATION REGARDING THE ACCIDENT. | | |
| 7 | OPERATOR | I WAS TOLD THAT THE ACCIDENT HAPPENED IN A PARKING LOT, SO COULD YOU TELL ME WHAT KIND OF SITUATION YOUR CAR IS IN? | ACCIDENT SITUATION | GRADATIONS INCLUDING WHITE AT BOTH ENDS AND GREEN AT CENTER |
| 8 | CUSTOMER | THE REAR BUMPER HIT AGAINST A WALL AND CAME OFF, AND I WAS SHOCKED. | | |
| 9 | OPERATOR | I AM SORRY TO HEAR THAT. | | |
| 10 | OPERATOR | I AM WORRIED ABOUT YOUR BODY. | | |
| 11 | OPERATOR | ARE YOU OKAY? | INJURY SITUATION | GRADATIONS INCLUDING WHITE AT BOTH ENDS AND BLUE AT CENTER |
| 12 | CUSTOMER | YES, I AM OKAY. | | |
| 13 | OPERATOR | THAT IS GOOD TO HEAR. | | |
| 14 | CUSTOMER | THE SHOCK WAS NOT SO BIG. | | |
| 15 | OPERATOR | SO, HAVE YOU SENT YOUR CAR FOR REPAIR ALREADY? | REPAIR SITUATION | GRADATIONS FROM WHITE TO ORANGE |

*FIG. 10*

| UTTERANCE ID | SPEAKER INFORMATION | UTTERANCE TEXT | ANNOTATION INFORMATION (TOPIC) |
|---|---|---|---|
| 1 | OPERATOR | I AM BB FROM AA INSURANCE. | OPENING |
| 2 | CUSTOMER | IS MR. OR MS. CC AT HOME? | |
| 3 | OPERATOR | YES. I AM CC. | |
| 4 | CUSTOMER | I AM CALLING YOU REGARDING THE CAR ACCIDENT, SO DO YOU HAVE A MOMENT? | |
| 5 | OPERATOR | YES. I DO | |
| 6 | OPERATOR | SO, LET ME CONFIRM THE SITUATION REGARDING THE ACCIDENT. | ACCIDENT SITUATION |
| 7 | CUSTOMER | I WAS TOLD THAT THE ACCIDENT HAPPENED IN A PARKING LOT, SO COULD YOU TELL ME WHAT KIND OF SITUATION YOUR CAR IS IN? | |
| 8 | OPERATOR | THE REAR BUMPER HIT AGAINST A WALL AND CAME OFF, AND I WAS SHOCKED. | |
| | | I AM SORRY TO HEAR THAT. | |
| | | I AM WORRIED ABOUT YOUR BODY. | INJURY SITUATION |
| | | ARE YOU OKAY? | |
| 9 | CUSTOMER | YES, I AM OKAY. | |
| 10 | OPERATOR | THAT IS GOOD TO HEAR. | |
| 11 | CUSTOMER | I DID NOT HAVE ANY SHOCK | |
| 12 | OPERATOR | SO, HAVE YOU SENT YOUR CAR FOR REPAIR ALREADY? | REPAIR SITUATION |

*FIG. 13*

| UTTERANCE ID | SPEAKER INFORMATION | UTTERANCE TEXT | TOPIC | ACCURACY OF TOPIC |
|---|---|---|---|---|
| 1 | OPERATOR | I AM BB FROM AA INSURANCE. IS MR. OR MS. CC AT HOME? | OPENING | 100% |
| 2 | CUSTOMER | YES, I AM CC. | OPENING | 100% |
| 3 | OPERATOR | I AM CALLING YOU REGARDING THE CAR ACCIDENT, SO DO YOU HAVE A MOMENT? | OPENING | 100% |
| 4 | CUSTOMER | YES, I DO. | OPENING | 100% |
| 5 | OPERATOR | SO, LET ME CONFIRM THE SITUATION REGARDING THE ACCIDENT. | OPENING | 60% |
| 6 | OPERATOR | I WAS TOLD THAT THE ACCIDENT HAPPENED IN A PARKING LOT. SO COULD YOU TELL ME WHAT KIND OF SITUATION YOUR CAR IS IN? | ACCIDENT SITUATION | 90% |
| 7 | CUSTOMER | THE REAR BUMPER HIT AGAINST A WALL AND CAME OFF, AND I WAS SHOCKED. | ACCIDENT SITUATION | 100% |
| 8 | OPERATOR | I AM SORRY TO HEAR THAT. I AM WORRIED ABOUT YOUR BODY. ARE YOU OKAY? | INJURY SITUATION | 70% |
| 9 | CUSTOMER | YES, I AM OKAY. | INJURY SITUATION | 100% |
| 10 | OPERATOR | THAT IS GOOD TO HEAR. | INJURY SITUATION | 100% |
| 11 | CUSTOMER | I DID NOT HAVE ANY SHOCK. | INJURY SITUATION | 40% |
| 12 | OPERATOR | SO, HAVE YOU SENT YOUR CAR FOR REPAIR ALREADY? | REPAIR SITUATION | 100% |

FIG. 14

| RELATIONSHIP BETWEEN UTTERANCE TEXT AND TOPIC ASSOCIATED WITH UTTERANCE TEXT | GRADATION RULE |
|---|---|
| LAST UTTERANCE TEXT OF TOPIC FOLLOWED BY NEXT TOPIC | COLOR CORRESPONDING TO TOPIC IS DISPLAYED TO ACCURACY OF TOPIC AND GRADATIONS IN WHICH COLOR CHANGES FROM COLOR CORRESPONDING TO TOPIC TO WHITE ARE DISPLAYED FROM ACCURACY OF TOPIC. IN CASE WHERE ACCURACY IS 100%, COLOR CORRESPONDING TO TOPIC IS DISPLAYED WITHOUT GRADATIONS. |
| FIRST UTTERANCE TEXT OF TOPIC THAT CONTINUES | GRADATIONS IN WHICH COLOR CHANGES FROM WHITE TO COLOR CORRESPONDING TO TOPIC ARE DISPLAYED TO 100-(ACCURACY OF TOPIC), AND COLOR CORRESPONDING TO TOPIC IS DISPLAYED FROM 100-(ACCURACY OF TOPIC). IN CASE WHERE ACCURACY IS 100%, COLOR CORRESPONDING TO TOPIC IS DISPLAYED WITHOUT GRADATIONS. |
| TOPICS ARE SWITCHED IN MIDDLE | GRADATIONS IN WHICH COLOR CHANGES FROM COLOR CORRESPONDING TO TOPIC BEFORE SWITCHING TO WHITE ARE DISPLAYED TO ACCURACY OF TOPIC, AND GRADATIONS IN WHICH COLOR CHANGES FROM WHITE TO COLOR CORRESPONDING TO TOPIC AFTER SWITCHING ARE DISPLAYED FROM ACCURACY OF TOPIC |
| OTHER THAN ABOVE | COLOR CORRESPONDING TO TOPIC IS DISPLAYED ENTIRELY AND GRADATIONS ARE NOT DISPLAYD |

POSITION CORRESPONDING ACCURACY

0%

60%

100%

RANGE IN WHICH ANNOTATION INFORMATION CORRESPONDING TO ONE PART OF UTTERANCE IS EXPRESSED

START POINT

RANGE IN WHICH COLOR CORRESPONDING TO ANNOTATION INFORMATION (TOPIC) IS DISPLAYED

GRADATION RANGE (PORTION THAT CHANGES GRADUALLY)

END POINT

ONE UTTERANCE TEXT

ORDER OF TEXT SEQUENCE

FIG. 16

| DETERMINATION UNIT ID | SPEAKER INFORMATION | UTTERANCE TEXT | ANNOTATION INFORMATION (TOPIC) | ANNOTATION EXPRESSION INFORMATION |
|---|---|---|---|---|
| 1 | OPERATOR | I AM BB FROM AA INSURANCE. IS MR. OR MS. CC AT HOME? | OPENING | GRAY |
| 2 | CUSTOMER | YES, I AM CC. | OPENING | GRAY |
| 3 | OPERATOR | I AM CALLING YOU REGARDING THE CAR ACCIDENT, SO DO YOU HAVE A MOMENT? | OPENING | GRAY |
| 4 | CUSTOMER | YES, I DO. | OPENING | GRAY |
| 5 | OPERATOR | SO, LET ME CONFIRM THE SITUATION REGARDING THE ACCIDENT. | OPENING | GRAY TO 60% FROM GRAY TO WHITE FROM 60% |
| 6 | OPERATOR | I WAS TOLD THAT THE ACCIDENT HAPPENED IN A PARKING LOT. SO COULD YOU TELL ME WHAT KIND OF SITUATION YOUR CAR IS IN? | ACCIDENT SITUATION | WHITE TO 60% FROM WHITE TO GREEN FROM 60% |
| 7 | CUSTOMER | THE REAR BUMPER HIT AGAINST A WALL AND CAME OFF, AND I WAS SHOCKED. | ACCIDENT SITUATION | GREEN |
| 8 | OPERATOR | I AM SORRY TO HEAR THAT. I AM WORRIED ABOUT YOUR BODY. ARE YOU OKAY? | INJURY SITUATION | FROM GREEN TO WHITE TO 60% FROM WHITE TO BLUE FROM 60% |
| 9 | CUSTOMER | YES, I AM OKAY. | INJURY SITUATION | BLUE |
| 10 | OPERATOR | THAT IS GOOD TO HEAR. | INJURY SITUATION | BLUE |
| 11 | CUSTOMER | I DID NOT HAVE ANY SHOCK. | INJURY SITUATION | BLUE TO 60% FROM BLUE TO WHITE FROM 60% |
| 12 | OPERATOR | SO, HAVE YOU SENT YOUR CAR FOR REPAIR ALREADY? | REPAIR SITUATION | ORANGE |

*FIG. 17*

| UTTERANCE ID | SPEAKER INFORMATION | UTTERANCE TEXT | ANNOTATION INFORMATION (TOPIC) |
|---|---|---|---|
| 1 | OPERATOR | I AM BB FROM AA INSURANCE. IS MR. OR MS. CC AT HOME? | |
| 2 | CUSTOMER | YES. I AM CC. | OPENING |
| 3 | OPERATOR | I AM CALLING YOU REGARDING THE CAR ACCIDENT, SO DO YOU HAVE A MOMENT? | |
| 4 | CUSTOMER | YES, I DO. | |
| 5 | OPERATOR | SO, LET ME CONFIRM THE SITUATION REGARDING THE ACCIDENT. | |
| 6 | OPERATOR | I WAS TOLD THAT THE ACCIDENT HAPPENED IN A PARKING LOT. SO COULD YOU TELL ME WHAT KIND OF SITUATION YOUR CAR IS IN? | ACCIDENT SITUATION |
| 7 | CUSTOMER | THE REAR BUMPER HIT AGAINST A WALL AND CAME OFF, AND I WAS SHOCKED. | |
| 8 | OPERATOR | I AM SORRY TO HEAR THAT. I AM WORRIED ABOUT YOUR BODY. ARE YOU OKAY? | |
| 9 | CUSTOMER | YES, I AM OKAY. | INJURY SITUATION |
| 10 | OPERATOR | THAT IS GOOD TO HEAR. | |
| 11 | CUSTOMER | I DID NOT HAVE ANY SHOCK. | |
| 12 | OPERATOR | SO, HAVE YOU SENT YOUR CAR FOR REPAIR ALREADY? | REPAIR SITUATION |

FIG. 19

| OPERATOR | ANNOTATION INFORMATION (TOPIC) | CUSTOMER |
|---|---|---|
| I AM BB FROM AA INSURANCE. | | |
| IS MR. OR MS. CC AT HOME? | | |
| I AM CALLING YOU REGARDING THE CAR ACCIDENT, SO DO YOU HAVE A MOMENT? | OPENING | YES, I AM CC. |
| | | YES, I DO. |
| SO, LET ME CONFIRM THE SITUATION REGARDING THE ACCIDENT. | | |
| I WAS TOLD THAT THE ACCIDENT HAPPENED IN A PARKING LOT, SO COULD YOU TELL ME WHAT KIND OF SITUATION YOUR CAR IS IN? | ACCIDENT SITUATION | THE REAR BUMPER HIT AGAINST A WALL AND CAME OFF, AND I WAS SHOCKED. |
| I AM SORRY TO HEAR THAT. | | |
| I AM WORRIED ABOUT YOUR BODY. | | |
| ARE YOU OKAY? | INJURY SITUATION | YES, I AM OKAY. |
| THAT IS GOOD TO HEAR. | | |
| SO, HAVE YOU SENT YOUR CAR FOR REPAIR ALREADY? | REPAIR SITUATION | I DID NOT HAVE ANY SHOCK. |

FIG. 20

| OPERATOR | ANNOTATION INFORMATION (TOPIC) | CUSTOMER |
|---|---|---|
| I AM BB FROM AA INSURANCE. | | |
| IS MR. OR MS. CC AT HOME? | | |
| | OPENING | YES, I AM CC. |
| I AM CALLING YOU REGARDING THE CAR ACCIDENT, SO DO YOU HAVE A MOMENT? | | YES, I DO. |
| SO, LET ME CONFIRM THE SITUATION REGARDING THE ACCIDENT. | | |
| I WAS TOLD THAT THE ACCIDENT HAPPENED IN A PARKING LOT, SO COULD YOU TELL ME WHAT KIND OF SITUATION YOUR CAR IS IN? | ACCIDENT SITUATION | THE REAR BUMPER HIT AGAINST A WALL AND CAME OFF, AND I WAS SHOCKED. |
| I AM SORRY TO HEAR THAT | | |
| I AM WORRIED ABOUT YOUR BODY. | | |
| ARE YOU OKAY? | INJURY SITUATION | YES, I AM OKAY. |
| THAT IS GOOD TO HEAR. | | I DID NOT HAVE ANY SHOCK. |
| SO, HAVE YOU SENT YOUR CAR FOR REPAIR ALREADY? | REPAIR SITUATION | |

*FIG. 21*

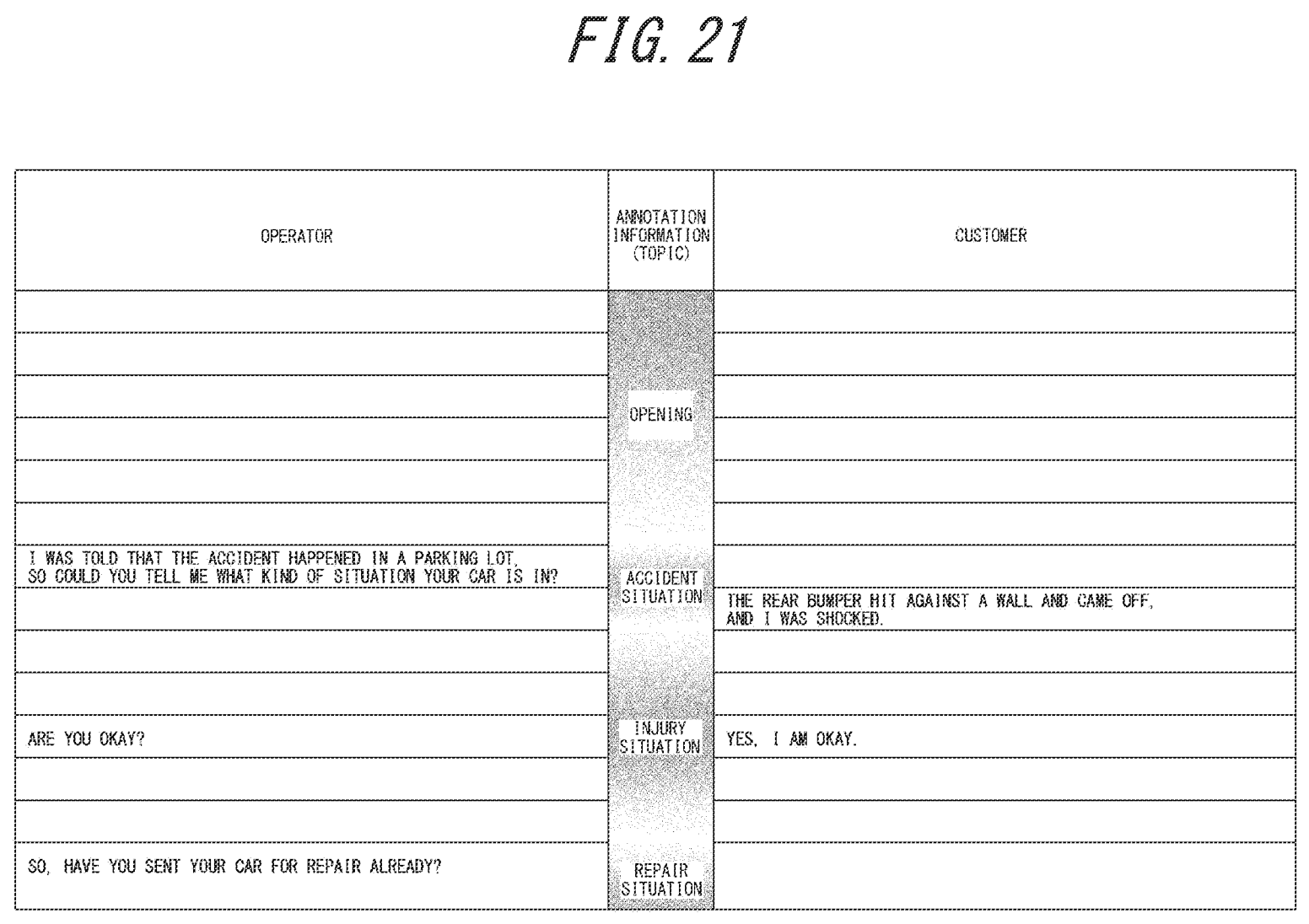

| OPERATOR | ANNOTATION INFORMATION (TOPIC) | CUSTOMER |
|---|---|---|
| | | |
| | OPENING | |
| I WAS TOLD THAT THE ACCIDENT HAPPENED IN A PARKING LOT, SO COULD YOU TELL ME WHAT KIND OF SITUATION YOUR CAR IS IN? | | |
| | ACCIDENT SITUATION | |
| | | THE REAR BUMPER HIT AGAINST A WALL AND CAME OFF, AND I WAS SHOCKED. |
| | INJURY SITUATION | |
| ARE YOU OKAY? | | |
| | | YES, I AM OKAY. |
| | REPAIR SITUATION | |
| SO, HAVE YOU SENT YOUR CAR FOR REPAIR ALREADY? | | |

DISPLAY DATA GENERATION DEVICE, DISPLAY DATA GENERATION METHOD, AND DISPLAY DATA GENERATION PROGRAM

CROSS-REFERENCE TO RELATED APPLICATIONS

This application is a continuation of U.S. patent application Ser. No. 18/552,865, filed on Sep. 27, 2023, which application is a U.S. 371 Application of International Patent Application No. PCT/JP2021/013692, filed on 30 Mar. 2021, the disclosures of which are hereby incorporated herein by reference in their entireties.

TECHNICAL FIELD

The present disclosure relates to a display data generation device, a display data generation method, and a display data generation program.

BACKGROUND ART

An operator of a contact center is required to receive inquiry about products, service, or the like from customers or to provide support for solving issues of the customers. For the purpose of improving analysis of inquiry from customers and quality of reception, an operator creates a history of reception with customers and shares the history inside the contact center.

Non Patent Literature 1 discloses a system that assists an operator by presenting appropriate information to the operator in reception on the basis of a business matter of a customer calling a contact center (call center). The system disclosed in Non Patent Literature 1 displays utterance texts of an operator and a customer on the left part of a screen, and displays, on the right part of the screen, an utterance text indicating a business matter of the customer or a similar question having a high score and an answer thereof among FAQs retrieved according to an utterance text for confirming the business matter by the operator. Furthermore, in Non Patent Literature 1, after a scene is estimated for each part of utterance, keywords are extracted only for a part of utterance of a predetermined scene, and FAQs are retrieved. (A scene is obtained by classifying an utterance text according to a type of the occasion in conversation between an operator and a customer. For example, a scene is obtained by classifying a flow in which the operator firstly says his/her own name, the customer talks about a business matter in calling, the operator confirms the business matter, confirms a contractor and contract content, then responds to the business matter, finally expresses gratitude, and ends the conversation into occasions including "opening", "inquiry grasping", "response", "closing", and the like. Such an estimation result of a scene is given as a label to an utterance text.)

CITATION LIST

Non Patent Literature

Non Patent Literature 1: Takaaki Hasegawa and three others, "Automatic Recognition Support System That Supports Reception by Operator," NTT Technical Journal, P16-19, 2019, vol. 31, No. 7

SUMMARY OF INVENTION

Technical Problem

In technique described in Non Patent Literature 1, a user refers to utterance texts of an operator and a customer, a similar question (having a high score of a FAQ automatically retrieved according to an utterance text for telling a business matter by the customer or an utterance text for confirming the business matter by the operator), and an answer thereof. However, a label such as a scene estimation result (annotation information) is not presented, and visualizing the annotation information so that a user can easily recognize the annotation information has been difficult.

An object of the present disclosure made in view of the above issue is to provide a display data generation device, a display data generation method, and a display data generation program capable of visualizing annotation information.

Solution to Problem

In order to solve the above issue, there are included an input unit that receives input of target data including a text sequence according to the present disclosure and annotation information corresponding to texts included in the text sequence, and a display preparation unit that determines, on the basis of the annotation information, annotation expression information indicating a background color of a display screen of a display device and a position and a range in which a corresponding background color is displayed for expressing correspondence relationship between the texts and the annotation information in a case where the display device displays the texts, and generates display data for causing the text sequence and the annotation information to be displayed according to a sequence in the text sequence, the display data being for causing the background color indicated by the annotation expression information to be displayed at the position and the range indicated by the annotation expression information.

Furthermore, in order to solve the above issue, a display data generation method according to the present disclosure includes a step for receiving input of target data including a text sequence and annotation information corresponding to texts included in the text sequence, and a step for determining, on the basis of the annotation information, annotation expression information indicating a background color of a display screen of a display device and a position and a range in which a corresponding background color is displayed for expressing correspondence relationship between the texts and the annotation information in a case where the display device displays the texts, and generating display data for causing the text sequence and the annotation information to be displayed according to a sequence in the text sequence, the display data being for causing the background color indicated by the annotation expression information to be displayed at the position and the range indicated by the annotation expression information.

Furthermore, in order to solve the above issue, a display data generation program according to the present disclosure causes a computer to function as the above-described display data generation device.

Advantageous Effects of Invention

According to a display method, a display data generation device, and a display data generation program according to the present disclosure, annotation information can be visualized.

BRIEF DESCRIPTION OF DRAWINGS

FIG. 2 is a diagram illustrating an example of target data input by an input unit illustrated in FIG. 1.

FIG. 3 is a diagram illustrating an example of correspondence between annotation information and colors stored in a color storage unit illustrated in FIG. 1.

FIG. 4 is a diagram illustrating an example of display data generated by a display preparation unit illustrated in FIG. 1.

FIG. 5 is an example of a screen displayed by a display data output unit illustrated in FIG. 1.

FIG. 8 is a diagram illustrating an example of gradation rules stored in a gradation rule storage unit illustrated in FIG. 7.

FIG. 9 is a diagram illustrating an example of display data generated by a display preparation unit illustrated in FIG. 7.

FIG. 10 is an example of a screen displayed by a display data output unit illustrated in FIG. 7.

FIG. 13 is a diagram illustrating an example of target data input by an input unit illustrated in FIG. 12.

FIG. 14 is a diagram illustrating an example of gradation rules stored in a gradation rule storage unit illustrated in FIG. 12.

FIG. 16 is a diagram illustrating an example of display data generated by a display preparation unit illustrated in FIG. 12.

FIG. 17 is an example of a screen displayed by a display data output unit illustrated in FIG. 12.

FIG. 19 is an example of a screen displayed by a first modification of the display data output unit illustrated in FIG. 7.

FIG. 20 is an example of a screen displayed by a second modification of the display data output unit illustrated in FIG. 7.

FIG. 21 is an example of a screen displayed by a third modification of the display data output unit illustrated in FIG. 7.

DESCRIPTION OF EMBODIMENTS

First, embodiments of the present disclosure will be described with reference to the drawings.

First Embodiment

Figure 1:
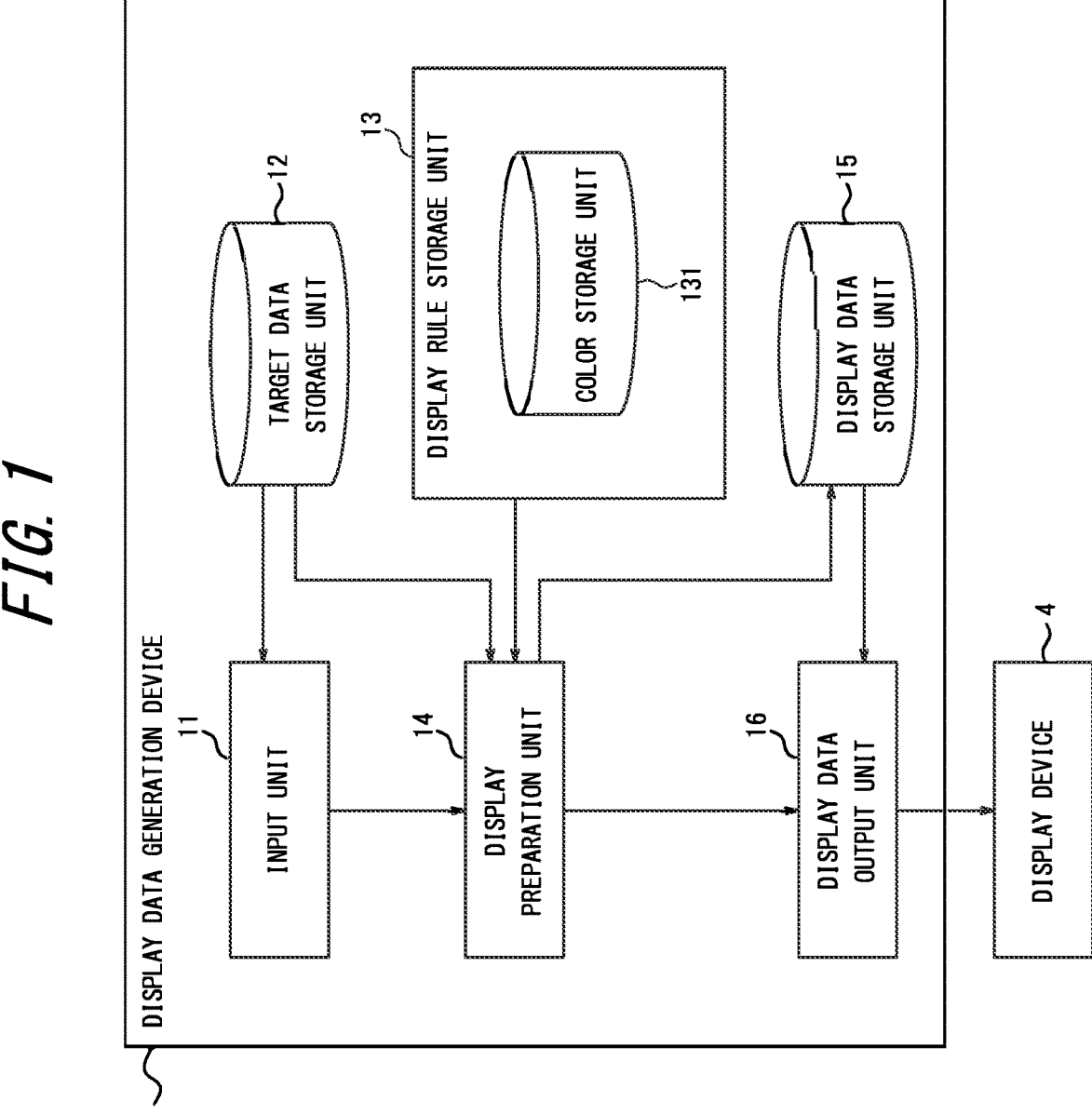
FIG. 1 is an overall schematic diagram of a display data generation device according to a first embodiment.

An overall configuration of a first embodiment will be described with reference to FIG. 1. FIG. 1 is a schematic diagram of a display data generation device 1 according to the present embodiment.

(Functional Configuration of Display Data Generation Device)

As illustrated in FIG. 1, the display data generation device 1 according to the first embodiment includes an input unit 11, a target data storage unit 12, a display rule storage unit 13, a display preparation unit 14, a display data storage unit 15, and a display data output unit 16. The input unit 11 includes an input interface that receives input of information. The input interface may be a keyboard, a mouse, a microphone, or the like, or may be an interface for receiving information received from another device via a communication network. The target data storage unit 12, the display rule storage unit 13, and the display data storage unit 15 each include, for example, a read only memory (ROM) or a storage. The display preparation unit 14 is included in a control unit (controller). The control unit may include dedicated hardware such as an application specific integrated circuit (ASIC) or a field-programmable gate array (FPGA), may include a processor, or may be formed to include both dedicated hardware and a processor. The display data output unit 16 includes an output interface that outputs information.

The input unit 11 receives input of target data including text sequences and annotation information corresponding to texts included in the text sequences as illustrated in FIG. 2. The target data may further include text identifications (IDs) for identifying the texts. The target data may further include a sequence order in which utterance texts are arranged. The sequence order is information indicating order in a case where there is order among the texts included in the text sequences. In each embodiment, the texts are texts obtained by performing voice recognition on voice data, texts obtained by transcribing voice, texts included in a chat, texts in a journal, texts in a story, or the like, but are not limited thereto. The sequence order is information for arranging utterance by a plurality of people in chronological order in voice conversation, chat, or the like by a plurality of speakers. Furthermore, the sequence order is arrangement order of texts in sentences in texts in a journal, a story, or the like. The sequence order can be meaningful order for arranging texts from the beginning to the end in text sequences. In the present embodiment, the sequence order is indicated by text IDs, but is not limited thereto. Note that it is not essential that the target data includes the text IDs, and information indicating the sequence order may be included in the utterance texts in a configuration in which the target data does not include the text IDs.

The utterance texts are texts indicating utterance content uttered by a plurality of speakers in conversation performed by the plurality of speakers. One utterance text is a text output in a unit of a speech end (unit in which whether an operator or a customer has ended speaking or has ended speaking what he/she wants to say is determined) in response to a result of voice recognition. The utterance texts may be data in a text format. The plurality of speakers may be, for example, an operator in a call center and a customer who makes inquiry to the call center, and hereinafter, an example of target data including annotation information regarding conversation performed between the operator and the customer will be described. However, in each embodiment described in the present specification, the plurality of speakers who utters utterance texts included in target data is not limited to an operator and a customer. One utterance text is an utterance text as a section in an utterance text uttered by any one of the plurality of speakers. The section of an utterance text may be determined by any rule, may be determined by an operation by a speaker who has uttered the utterance text, or may be determined by a computer that performs voice recognition by any algorithm. In a case where the texts are utterance texts, speaker information indicating speakers who have uttered the utterance texts may be further included. Furthermore, in a case where the texts are utterance texts, text IDs for identifying the utterance texts are referred to as utterance IDs. Hereinafter, description will be given using utterance texts as an example of the texts, but the texts included in the target data processed by the display data generation device of the present embodiment are not limited to utterance texts, and may be any texts.

The annotation information refers to information (metadata) related to utterance texts given to each of the utterance texts. The annotation information may be topics of the utterance texts, scenes in which the utterance texts are uttered, or some classification labels.

The target data storage unit 12 stores the target data input by the input unit 11.

The display rule storage unit 13 stores rules for the display preparation unit 14 to determine annotation expression information of the utterance texts on the basis of the annotation information.

The annotation expression information is information indicating background colors of a display screen of a display device 4 and positions and ranges in which the background colors are displayed for expressing correspondence relationship between the utterance texts and the annotation information in a case where the display device 4 displays the utterance texts. The positions and ranges in which the background colors are displayed may include display positions and display ranges of the annotation information, respectively. In the first embodiment, the annotation expression information is background colors of the annotation information.

The display rule storage unit 13 includes a color storage unit 131. The color storage unit 131 stores rules indicating association between the annotation information and the annotation expression information. In the first embodiment, as illustrated in FIG. 3, the color storage unit 131 stores color arrangement rules indicating association between the annotation information and the annotation expression information (background colors of the display screen). The annotation expression information associated with the annotation information in the color arrangement rules may be determined by a computer using any algorithm, or may be determined by an administrator of the display data generation device 1.

The display preparation unit 14, on the basis of the annotation information, determines the annotation expression information indicating the background colors of the display screen of the display device 4 and the positions and ranges in which the background colors are displayed for expressing the correspondence relationship between the texts and the annotation information in a case where the display device 4 displays the utterance texts. The display preparation unit 14 may divide the utterance texts and determine annotation expression information of the utterance texts obtained by dividing. Hereinafter, the utterance texts obtained by dividing are referred to as "divided utterance texts". In a case where the utterance texts obtained by dividing and undivided utterance texts are distinguished, the utterance texts obtained by dividing are referred to as "divided utterance texts", and the undivided utterance texts are simply referred to as "utterance texts", however, in a case where the utterance texts obtained by dividing and the undivided utterance texts are not distinguished, both the utterance texts obtained by dividing and the undivided utterance texts may be simply referred to as "utterance texts".

Specifically, first, the display preparation unit 14 divides the utterance texts included in the target data input by the input unit 11. The display preparation unit 14 can divide the utterance texts by any algorithm. At this time, the display preparation unit 14 uniquely identifies the divided utterance texts, and gives determination unit IDs indicating utterance text sequences of the divided utterance texts. For example, the display preparation unit 14 may divide the utterance texts into portions before periods and portions after the periods. In the example illustrated in FIG. 2, an utterance text corresponding to an utterance ID "1" is "I am BB from AA insurance. Is Mr. or Ms. CC at home?". The display preparation unit 14 divides the utterance text into "I am BB of AA insurance." and "Is Mr. or Ms. CC at home?" as illustrated in FIG. 4 by the period, and associates the determination unit ID "1" and a determination unit ID "2", respectively. Furthermore, the display preparation unit 14 determines that annotation information of the divided utterance texts is annotation information of the utterance texts of the division source. In the example illustrated in FIG. 4, the display preparation unit 14 determines that a topic that is annotation information of utterance texts corresponding to determination unit IDs "1" and "2" is "opening".

As described above, the display preparation unit 14 divides utterance texts into portions before periods and portions after the periods, but the present invention is not limited thereto. For example, the display preparation unit 14 may divide utterance texts for each word, or may divide utterance texts into portions before punctuation marks and portions after the punctuation marks. Note that the display preparation unit 14 may not divide utterance texts, and in such a configuration, for example, utterance texts included in target data may be undivided utterance texts.

The display preparation unit 14 forms a group including utterance texts that have the same annotation information and are continuous when arranged in the sequence order described above (hereinafter, the group is referred to as an "utterance text group"). The display preparation unit 14 determines annotation expression information indicating a color corresponding to the utterance text group using the color arrangement rules stored in the color storage unit 131. Specifically, the display preparation unit 14 determines that the annotation expression information of the utterance text group is a color corresponding to the annotation information of the utterance text group in the color arrangement rules.

Furthermore, upon determining the annotation expression information of the utterance text group, the display preparation unit 14 determines whether annotation expression information of all the utterance texts has been determined. In a case of determining that annotation expression information of a part of the utterance texts has not been determined, the display preparation unit 24 repeats processing of forming an utterance text group and determining annotation expression information of the utterance text group for utterance texts for which the annotation expression information has not been determined. Furthermore, in a case of determining that the annotation expression information of all the utterance texts has been determined, the display preparation unit 24 generates display data for causing the text sequences and the annotation expression information to be displayed according to the sequence order in the text sequences, the display data being for displaying background colors indicated by the annotation expression information at positions and ranges indicated by the annotation expression information. For example, as illustrated in FIG. 4, the display data can include the determination unit IDs, the speaker information, the utterance texts, the annotation information, and the annotation expression information.

The display data storage unit 15 stores the display data generated by the display preparation unit 14.

The display data output unit 16 outputs the display data. The display data output unit 16 may output the display data to the display device 4 such as a liquid crystal panel or an organic electro luminescence (EL), or may output the display data to another device via the communication network.

Accordingly, the display device 4 displays the display screen on the basis of the display data. Specifically, as illustrated in FIG. 5, the display device 4 displays the utterance texts included in the display data in the utterance text sequences described above. The display device 4 displays the annotation information corresponding to the utterance texts in association with the utterance texts, and further displays the backgrounds of the annotation information in the colors indicated by the annotation expression information included in the display data. Furthermore, the display device 4 may further display one or more of the utterance IDs and the speaker information in association with the utterance texts and the annotation information. Note that gray displayed on the background of "opening", green displayed on the background of "accident situation", blue displayed on the background of "injury situation", and orange displayed on the background of "injury situation" are indicated by black and white binary hatching different from each other in FIG. 5. Furthermore, as described above, since the annotation information includes scenes, the display device 4 can collectively display utterance for each of the scenes, and accordingly an operator can grasp a flow of conversation in perspective in order to understand the conversation. Note that, in a case where the display data output unit 16 transmits the display data to another device via the communication network, the other device displays the display screen on the basis of the display data, similarly to the display device 4.

(Operation of Display Data Generation Device)

Figure 6:
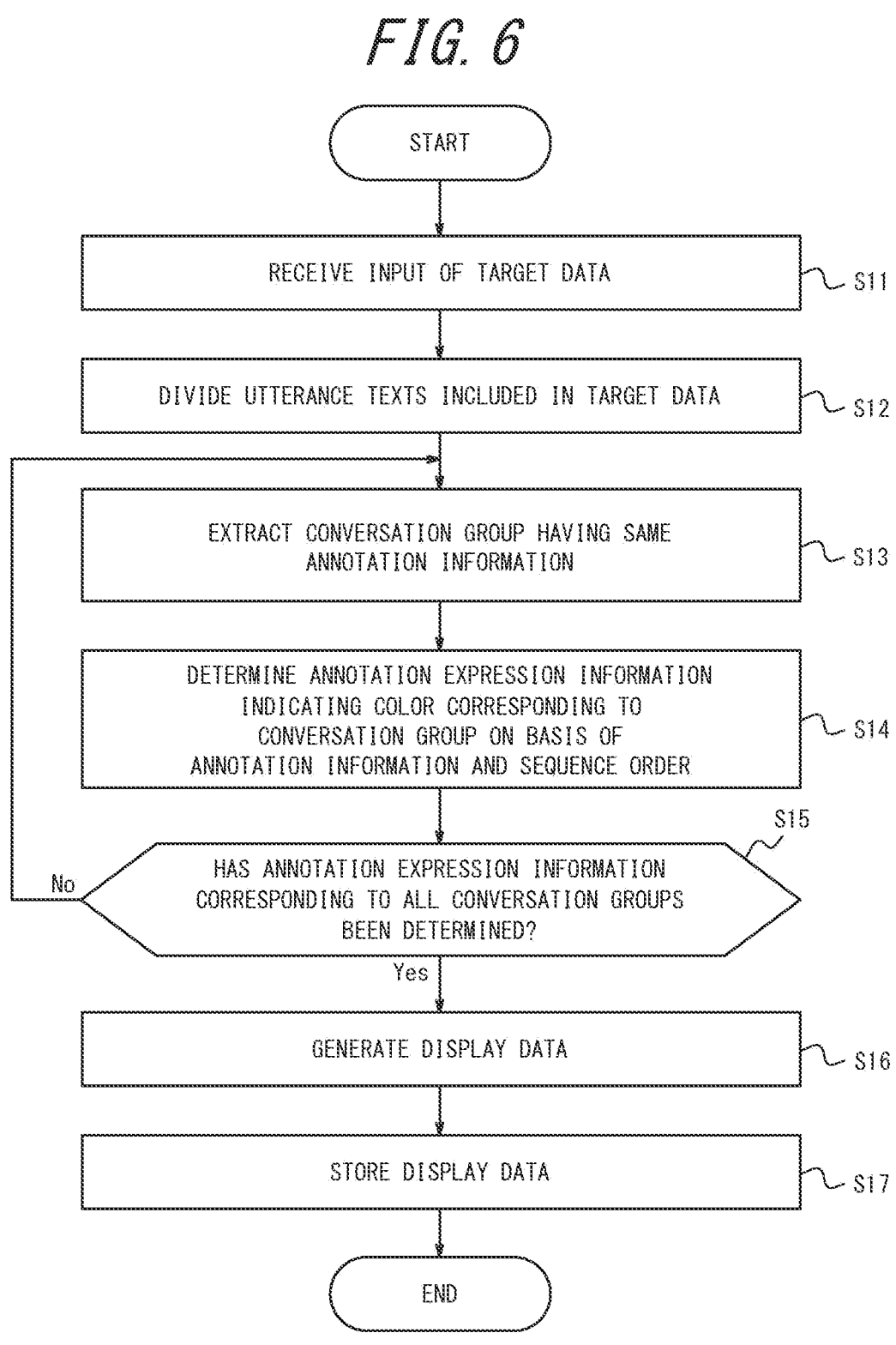
FIG. 6 is a flowchart illustrating an example of operation in the display data generation device illustrated in FIG. 1.

Here, operation of the display data generation device 1 according to the first embodiment will be described with reference to FIG. 6. FIG. 6 is a flowchart illustrating an example of the operation in the display data generation device 1 according to the first embodiment. The operation in the display data generation device 1 described with reference to FIG. 6 corresponds to a display method of the display data generation device 1 according to the first embodiment.

In step S11, the input unit 11 receives input of target data including utterance text sequences and annotation information corresponding to texts included in the utterance text sequences. In the present example, the target data further includes utterance IDs.

In step S12, the display preparation unit 14 divides the utterance texts included in the target data input by the input unit 11.

In step S13, the display preparation unit 14 forms an utterance text group including consecutive utterance texts having the same annotation information.

In step S14, the display preparation unit 14, on the basis of the annotation information and a sequence order, determines annotation expression information indicating a background color of the display screen of the display device 4 and a position and range in which the background color is displayed for expressing correspondence relationship between the utterance texts and the annotation information in a case where the display device 4 displays the utterance texts. In the present example, the display preparation unit 14 determines the annotation expression information indicating the color corresponding to the utterance text group on the basis of the annotation information.

In step S15, the display preparation unit 14 determines whether annotation expression information corresponding to all utterance text groups has been determined.

In a case of determining that annotation expression information corresponding to a part of the utterance text groups has not been determined in step S15, the processing returns to step S13, and the display preparation unit 14 repeats the processing. Furthermore, in a case of determining that the annotation expression information corresponding to all the utterance text groups has been determined in step S15, the display preparation unit 14, in step S16, generates display data for causing the utterance text sequences and the annotation information to be displayed according to sequences in the utterance text sequences, the display data being for causing background colors indicated by the annotation expression information to be displayed at positions and ranges indicated by the annotation expression information.

In step S17, the display data storage unit 15 stores the display data.

Thereafter, the display data output unit 16 outputs the display data at any timing. The display data output unit 16 may output the display data to the display device 4 such as a liquid crystal panel or an organic EL, or may output the display data to another device via the communication network. The any timing can be, for example, timing at which a display command is input to the input unit 11 by an operation of a user. Accordingly, the display device 4 displays the display screen on the basis of the display data. Specifically, the display device 4 displays the utterance texts and the annotation information on the basis of the display data, and displays the background colors indicated by the annotation expression information at the positions and ranges indicated by the annotation expression information.

Note that, in the above description, the display data generation device 1 performs processing of step S12, but the present invention is not limited thereto. For example, the display data generation device 1 may not perform the processing of step S12.

As described above, according to the first embodiment, the display data generation device 1, on the basis of annotation information, determines annotation expression information indicating background colors of the display screen of the display device 4 and positions and ranges in which the background colors are displayed for expressing correspondence relationship between utterance texts and utterance annotation information in a case where the display device 4 displays the utterance texts. The display data generation device 1 generates display data for causing the utterance text sequences and the annotation information to be displayed according to sequences in the utterance text sequences, and causing the background colors indicated by the annotation expression information to be displayed at the positions and ranges indicated by the annotation expression information. As a result, a user can intuitively grasp the annotation information by the background colors of the display screen. Therefore, the content of target data including the utterance texts corresponding to the annotation information can be quickly recognized.

Second Embodiment

Figure 7:
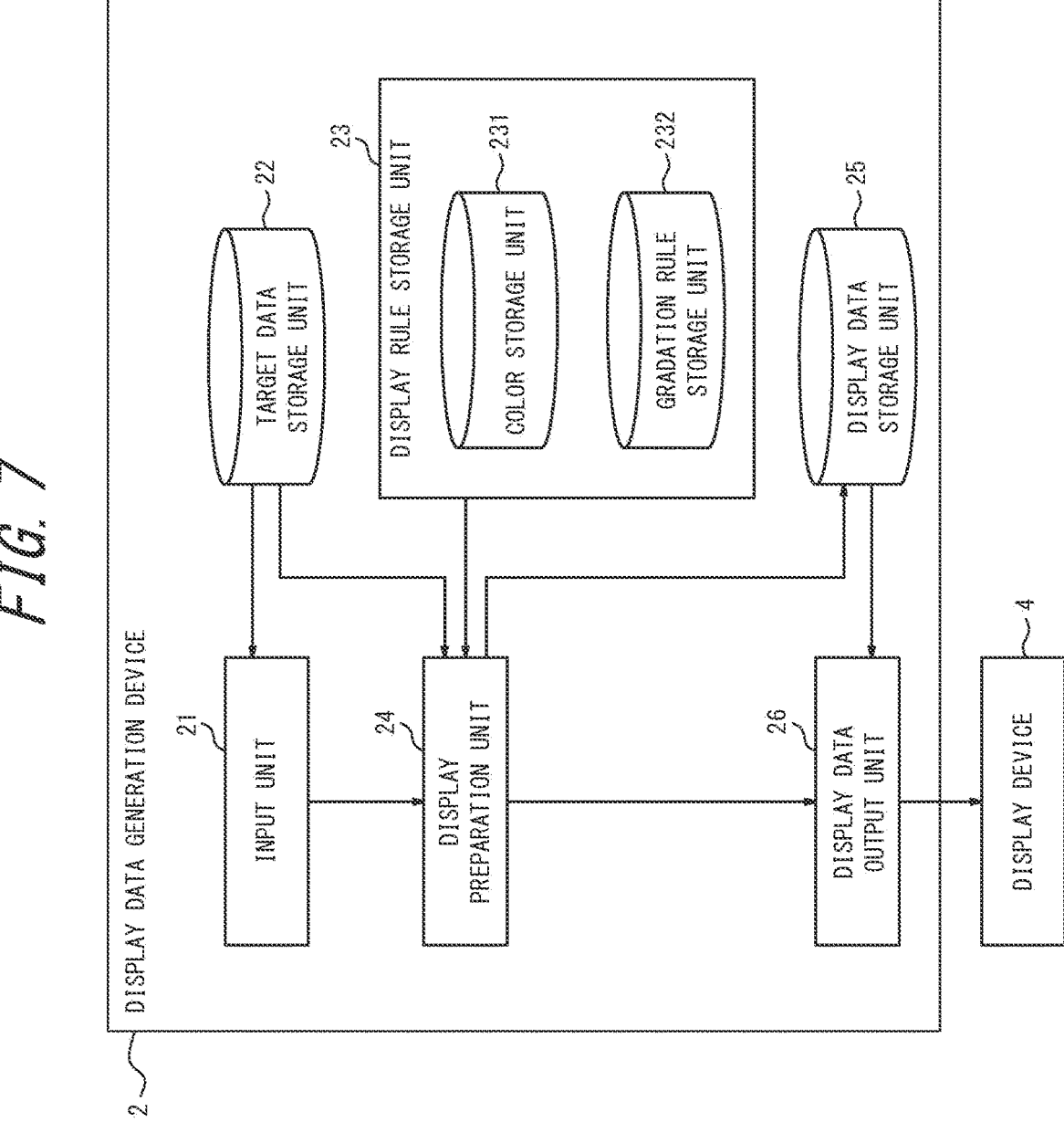
FIG. 7 is an overall schematic diagram of a display data generation device according to a second embodiment.

An overall configuration of a display data generation device 2 of a second embodiment will be described with reference to FIG. 7. FIG. 7 is a schematic diagram of the display data generation device 2 according to the present embodiment.

(Functional Configuration of Display Data Generation Device)

As illustrated in FIG. 7, the display data generation device 2 according to the second embodiment includes an input unit 21, a target data storage unit 22, a display rule storage unit 23, a display preparation unit 24, a display data storage unit 25, and a display data output unit 26. The input unit 21 includes an input interface that receives input of information similarly to the input unit 11 of the first embodiment. The target data storage unit 22, the display rule storage unit 23, and the display data storage unit 25 each include a memory similarly to the target data storage unit 12, the display rule storage unit 13, and the display data storage unit 15 of the first embodiment. Furthermore, the display preparation unit 24 and the display data output unit 26 are included in a control unit similarly to the display preparation unit 14 and the display data output unit 16 of the first embodiment.

The input unit 21 and the target data storage unit 22 are similar to the input unit 11 and the target data storage unit 12 of the display data generation device 2 according to the first embodiment. In the second embodiment, target data input by the input unit 21 and stored in the target data storage unit 22 further includes a sequence order in addition to text sequences included in target data of the first embodiment and annotation information corresponding to texts included in the text sequences.

The display rule storage unit 23 includes a color storage unit 231 and a gradation rule storage unit 232. The color storage unit 231 stores color arrangement rules similarly to the color storage unit 131 of the display data generation device 1 according to the first embodiment. In the color arrangement rules of the second embodiment, colors corresponding to annotation information may be different or the same. In the following specific example, the annotation information is topics.

The gradation rule storage unit 232 stores gradation rules for determining annotation expression information. As illustrated in FIG. 8, the gradation rules in the second embodiment are rules indicating gradations corresponding to the annotation information and the sequences. In the second embodiment, the annotation expression information is information indicating colors and gradations.

In the gradation rules of the example illustrated in FIG. 8, in a case where the first utterance text in the target data is included and the last utterance text is not included in utterance texts included in an utterance text group, the annotation expression information corresponding to the utterance text group is gradations in which the color continuously changes from a color corresponding to the topic to white from the start point toward the end point. Here, the start point is an end portion on the start point side in an arrangement direction (direction from top to bottom in an example illustrated in FIG. 10 to be referred to below) (the end portion is upper end portion in the example illustrated in FIG. 10) in a column in which topics are displayed in a case where utterance included in the target data is displayed in the above arrangement direction in the utterance text sequences. The end point is an end portion on the end point side in the above arrangement direction (lower end portion in the example illustrated in FIG. 10) in the column in which the topics are displayed. The colors corresponding to the topics are colors stored corresponding to the topics in the color arrangement rules.

Furthermore, in the gradation rules of the example illustrated in FIG. 8, in a case where the first utterance text in the target data is not included and the last utterance text is not included in utterance texts included in an utterance text group, the annotation expression information corresponding to the utterance text group is gradations in which the color continuously changes from white to a color corresponding to the topic from the start point toward the middle point and continuously changes from the color corresponding to the topic to white from the middle point toward the end point.

Furthermore, in the gradation rules of the example illustrated in FIG. 8, in a case where the first utterance text in the target data is not included and the last utterance text is included in utterance texts included in an utterance text group, the annotation expression information corresponding to the utterance text group is gradations in which the color continuously changes from white to a color corresponding to the topic from the start point toward the end point.

Furthermore, in the gradation rules of the example illustrated in FIG. 8, in a case where the first utterance text in the target data is included and the last utterance text is included in utterance texts included in an utterance text group, the annotation expression information corresponding to the utterance text group has no gradations.

However, the gradation rules are not limited to the example illustrated in FIG. 8, and may be any rules that colors corresponding to the topics do not clearly change. For example, in gradation rules of another example, in a case where the first utterance text in the target data is not included and the last utterance text is not included in utterance texts included in an utterance text group, the annotation expression information corresponding to the utterance text group is gradations in which the color continuously changes from a color corresponding to the topic to white from the start point toward the middle point and continuously changes from white to the color corresponding to the topic from the middle point toward the end point.

The display preparation unit 24 determines the annotation expression information of the utterance texts corresponding to the utterance text sequences and the annotation information on the basis of the annotation information and the utterance text sequences. At this time, the display preparation unit 24 may divide the utterance texts and determine annotation expression information on the basis of the divided utterance texts, the annotation information of the utterance texts, and the utterance text sequences.

Specifically, first, the display preparation unit 24 divides the utterance texts included in the target data input by the input unit 11 similarly to the display preparation unit 14 of the first embodiment. Note that the display preparation unit 24 may not perform the processing of dividing the utterance texts similarly to the display preparation unit 14 of the first embodiment. In such a configuration, for example, the utterance texts included in the target data may be the divided utterance texts.

The display preparation unit 24 forms an utterance text group similarly to the display preparation unit 14 of the first embodiment. In an example illustrated in FIG. 9, the display preparation unit 24 forms a group including utterance texts corresponding to determination unit IDs "1" to "6" having the same annotation information of "opening". Furthermore, the display preparation unit 24 forms a group including utterance texts corresponding to determination unit IDs "7" and "8" having the same annotation information of "accident situation". Similarly, the display preparation unit 24 forms a group including utterance texts corresponding to determination unit IDs "9" to "14" having the same annotation information of "injury situation". Similarly, the display preparation unit 24 forms a group including an utterance text corresponding to a determination unit ID "15" having the same annotation information of "repair situation".

The display preparation unit 24 determines the annotation expression information such that background colors gradually change toward boundaries between sequences in the utterance text sequences having different annotation information. In the present embodiment, the display preparation unit 24 determines annotation expression information corresponding to utterance text groups using the color arrangement rules and the gradation rules.

In an example in which the gradation rules illustrated in FIG. 8 are used, in a case where the first utterance text in the target data is included and the last utterance text is not included in utterance texts included in an utterance text group, the display preparation unit 24 determines that the annotation expression information is gradations in which the color continuously changes from a color corresponding to the topic to white (gradations from gray to white) from the start point toward the end point. Accordingly, the display preparation unit 24, as illustrated in FIG. 9, the display preparation unit 24 determines that the annotation expression information of the group including the utterance texts corresponding to the determination unit IDs "1" to "6" is gradations in which the color continuously changes from gray to white from the start point toward the end point. Here, the gray is a color corresponding to "opening" in the color arrangement rules.

Furthermore, in the example in which the gradation rules illustrated in FIG. 8 are used, in a case where the first utterance text in the target data is not included and the last utterance text is not included in utterance texts included in an utterance text group, the display preparation unit 24 determines that the annotation expression information is gradations in which the color continuously changes from white to a color corresponding to the topic from the start point toward the middle point and continuously changes from the color corresponding to the topic to white from the middle point toward the end point (gradations including white at both ends and green at the center). Here, the middle point is an intermediate point between the start point and the end point in the arrangement direction. Accordingly, as illustrated in FIG. 9, the display preparation unit 24 determines that the annotation expression information of the group including the utterance texts corresponding to the determination unit IDs "7" and "8" is gradations in which the color continuously changes from white to green from the start point toward the middle point and continuously changes from green to white from the middle point toward the end point. Here, the green is a color corresponding to "accident situation" in the color arrangement rules. Similarly, the display preparation unit 24 determines that the annotation expression information of the group including the utterance texts corresponding to the determination unit IDs "9" to "14" is gradations in which the color continuously changes from white to blue from the start point toward the middle point and continuously changes from blue to white from the middle point toward the end point (gradations including white at both ends and blue at the center). Here, the blue is a color corresponding to "injury situation" in the color arrangement rules.

Furthermore, in the example in which the gradation rules illustrated in FIG. 8 are used, in a case where the first utterance text in the target data is not included and the last utterance text is included in utterance texts included in an utterance text group, the display preparation unit 24 determines that the annotation expression information corresponding to the utterance text group is gradations in which the color continuously changes from white to a color corresponding to the topic from the start point toward the end point. Accordingly, as illustrated in FIG. 9, the display preparation unit 24 determines that the annotation expression information of the group including the utterance text corresponding to the determination unit ID "15" is gradations in which the color continuously changes from orange to white from the start point toward the end point (gradations from white to orange). Here, the orange is a color corresponding to "repair situation" in the color arrangement rules.

Furthermore, in the example in which the gradation rules illustrated in FIG. 8 are used, in a case where the first utterance text in the target data is included and the last utterance text is included in utterance texts included in an utterance text group, the display preparation unit 24 determines that the annotation expression information corresponding to the utterance text group has no gradations. Note that, in the example of FIG. 8, there is no utterance text group including the first utterance text and the last utterance text.

Upon determining the annotation expression information of the utterance text group, the display preparation unit 24 determines whether annotation expression information of all the utterance texts has been determined. In a case of determining that annotation expression information of a part of the utterance texts has not been determined, the display preparation unit 24 repeats processing of forming an utterance text group and determining annotation expression information of the utterance text group for utterance texts for which the annotation expression information has not been determined. Furthermore, in a case of determining that all the utterance text annotation expression information has been determined, the display preparation unit 24 generates display data in which determination unit IDs, speaker information, the utterance texts, the topics of respective utterance text groups, and the annotation expression information are associated with each other as illustrated in FIG. 9.

The display data storage unit 25 stores the display data generated by the display preparation unit 24.

The display data output unit 26 outputs the display data. The display data output unit 26 may output the display data to a display device 4 such as a liquid crystal panel or an organic EL, or may output the display data to another device via a communication network.

Accordingly, the display device 4 displays the display screen on the basis of the display data. Specifically, as illustrated in FIG. 10, the display device 4 displays the utterance texts included in the display data in the sequences described above. The display device 4 displays the annotation information corresponding to the utterance texts in association with the utterance texts, and further causes the background colors of the annotation information to be displayed using the color gradations indicated by the annotation expression information included in the display data. Note that, in FIG. 10, the gradations by gray and white that are background colors of "opening", the gradations by green and white that are background colors of "accident situation", the gradations by blue and white that are displayed on the background of "injury situation", and the gradations by orange and white that are background colors of "injury situation" are all indicated using gradations in black and white. The same applies to FIGS. 17 and 19 to 23 to be referred to below. Furthermore, the display device 4 may further display one or more of utterance IDs and the speaker information in association with the utterance texts and the annotation. Note that, in a case where the display data output unit 26 transmits the display data to another device via the communication network, the other device displays the display screen on the basis of the display data, similarly to the display device 4.

(Operation of Display Data Generation Device)

Figure 11:
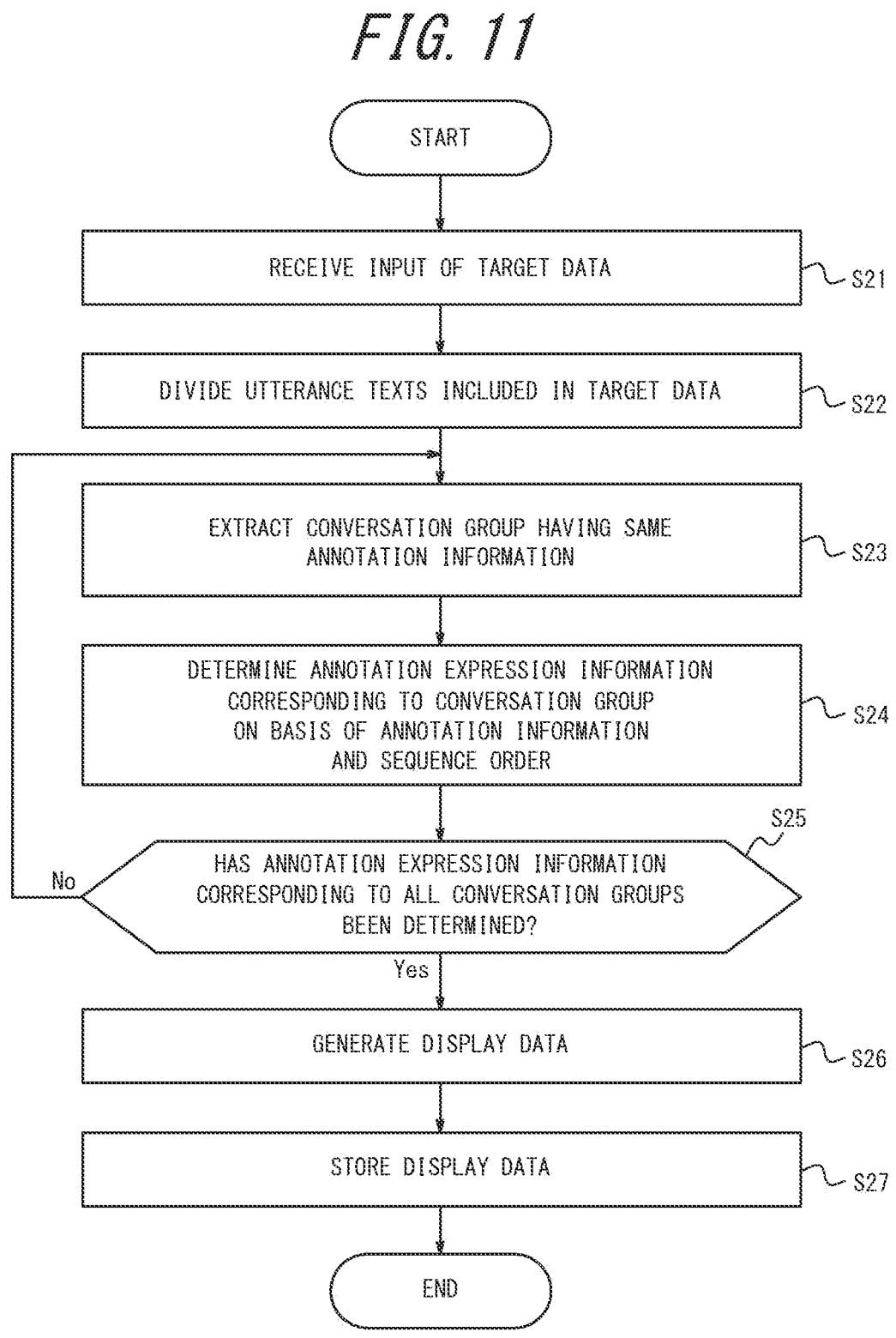
FIG. 11 is a flowchart illustrating an example of operation in the display data generation device illustrated in FIG. 7.

Here, operation of the display data generation device 2 according to the second embodiment will be described with reference to FIG. 11. FIG. 11 is a flowchart illustrating an example of the operation in the display data generation device 2 according to the second embodiment. The operation in the display data generation device 2 described with reference to FIG. 11 corresponds to a display method of the display data generation device 2 according to the second embodiment.

In step S21, the input unit 21 receives input of target data including utterance text sequences and annotation information corresponding to texts included in the utterance text sequences.

In step S22, the display preparation unit 24 divides the utterance texts included in the target data input by the input unit 21.

In step S23, the display preparation unit 24 forms an utterance text group including consecutive utterance texts having the same annotation information.

In step S24, the display preparation unit 24, on the basis of the annotation information and a sequence order, determines annotation expression information indicating a background color of the display screen of the display device 4 and a position and range in which the background color is displayed for expressing correspondence relationship between the utterance texts and the annotation information in a case where the display device 4 displays the utterance texts. In the present example, the display preparation unit 24 determines the annotation expression information indicating the color and gradations corresponding to the utterance text group.

In step S25, the display preparation unit 24 determines whether annotation expression information corresponding to all utterance text groups has been determined.

In a case of determining that annotation expression information corresponding to a part of the utterance text groups has not been determined in step S25, the processing returns to step S23, and the display preparation unit 24 repeats the processing. Furthermore, in a case of determining that the annotation expression information corresponding to all the utterance text groups has been determined in step S25, the display preparation unit 24, in step S26, generates display data for causing the utterance text sequences and the annotation information to be displayed according to sequences in the utterance text sequences, the display data being for causing background colors indicated by the annotation expression information to be displayed at positions and ranges indicated by the annotation expression information.

In step S27, the display data storage unit 25 stores the display data.

Thereafter, the display data output unit 26 outputs the display data at any timing. The display data output unit 26 may output the display data to the display device 4, or may output the display data to another device via the communication network. The any timing can be, for example, timing at which a display command is input to the input unit 21. Accordingly, the display device 4 displays the display screen on the basis of the display data. Specifically, the display device 4 displays the utterance texts and the annotation information on the basis of the display data, and displays the background colors indicated by the annotation expression information at the positions and ranges indicated by the annotation expression information.

Note that, in the above description, the display data generation device 2 performs processing of step S22, but the present invention is not limited thereto. For example, the display data generation device 2 may not perform the processing of step S22.

Here, effects of the second embodiment compared to the first embodiment will be described.

In target data including a plurality of utterance texts uttered by a plurality of speakers, one utterance text may not have only one topic. For example, a plurality of topics may be interpreted corresponding to one utterance text, and the topics may be switched in the middle of the one utterance text. In such a case, displaying the utterance text and the topics so that a user can accurately recognize the topics is difficult. For example, in a case where one topic among the plurality of topics corresponding to the utterance text is displayed in association with the utterance text, a user cannot recognize other topics corresponding to the utterance text. Furthermore, in a case where the utterance text in which the topics have been switched in the middle is divided according to the switching, and a corresponding topic is displayed for each of the divided utterance texts, a user may have difficulty in understanding the content of the utterance text only by referring to a divided utterance text. In other words, in a case where utterance texts are collectively displayed for each label such as a scene estimation result (annotation information), a user can recognize the utterance texts for each label. However, the utterance text does not necessarily correspond to one label, and in a case where a plurality of labels can correspond, visualizing annotation information so that a user can easily recognize the annotation information has been difficult. For example, there are a case where a plurality of labels corresponding to one utterance text can be interpreted, a case where an utterance text is long and the corresponding label changes in the middle, and the like.

Describing the target data illustrated in FIG. 2 as an example, since an utterance text "So, let me confirm the situation regarding the accident." at the initial stage of the utterance text sequences is a cliche phrase of opening, the topic of the utterance text is interpreted as "opening". Furthermore, since the utterance text includes a phrase "the situation regarding the accident", the topic of the utterance text is also interpreted as "accident situation". In such a case, when two topics "opening" and "accident situation" are displayed corresponding to the above utterance text, a user may have difficulty in understanding the topics of the utterance text. Furthermore, when either one of the two topics "opening" and "accident situation" is displayed corresponding to the above utterance text, a user cannot recognize the other topic.

Furthermore, the example illustrated in FIG. 2 illustrates that after an utterance text "The rear bumper hit against a wall and came off, and I was shocked." (utterance ID "7") has been uttered by a customer, an utterance text "I am sorry to hear that. I am worried about your body. Are you okay?" (utterance ID "8") has been uttered by an operator. Here, the topic of the utterance text "I am sorry to hear that." is "accident situation", and the topic of the utterance text "I am worried about your body." and "Are you okay?" is "injury situation". In this case, when the utterance text is divided by periods and the topics corresponding to the respective utterance texts of "I am sorry to hear that.", "I am worried about your body.", and "Are you okay?" are displayed, a user has difficulty in understanding the target pointed by the utterance text "Are you okay?", and accordingly, the content of the target data is difficult to be recognized.

On the other hand, according to the second embodiment, the displaying data generation device 2 determines annotation expression information such that background colors gradually change toward boundaries between sequences in the utterance text sequences having different annotation information. As a result, the displaying data generation device 2 can visualize the annotation information even in a case where a plurality of pieces of annotation information corresponds to one utterance text. As a result, a user can recognize that the topic of the utterance text is a topic indicated by a color and that there is a possibility that the topic of the utterance text is a topic not indicated by the color. In the example illustrated in FIG. 10, a user can recognize that the topic of the utterance text corresponding to the utterance ID "7" is "accident situation" and may be "injury situation". As a result, it can be understood that the target of "I am sorry to hear that." included in the utterance text corresponding to the utterance ID "8" following the utterance ID "7" may be "injury situation". Accordingly, a user can intuitively grasp utterance text related information by a background color of the information, and quickly and appropriately recognize the content of target data including utterance texts.

Similarly, the background of the topic "opening" (utterance IDs "1" to "5") is displayed using gradations in which the color changes from gray to white from the start point toward the end point. Furthermore, the background of the topic "accident situation" (utterance IDs "6" and "7") is displayed using gradation that change from white to green from the start point toward the middle point. Therefore, a user can recognize that the topic of the utterance text corresponding to ID "5" at the end of an utterance text group corresponding to the topic "opening" (utterance IDs "1" to "5") is "opening" and may be "accident situation". Accordingly, a user can intuitively grasp utterance text related information by a background color of the information, and quickly and appropriately recognize the content of target data including utterance texts.

Furthermore, if an utterance text is not divided and the utterance text "I am sorry to hear that. I am worried about your body. Are you okay?" is gradationally displayed without being divided, the range of the gradations is narrowed, and a user may have difficulty in understanding where "accident situation" ends and where "injury situation" starts. On the other hand, in the present embodiment, since the displaying data generation device 2 performs gradation display of three utterance texts obtained by dividing by, for example, periods as indicated by the utterance ID 8 in FIG. 10, the range of gradations is widened, and a user can more easily intuitively grasp the boundary between "accident situation" and "injury situation".

Third Embodiment

Figure 12:
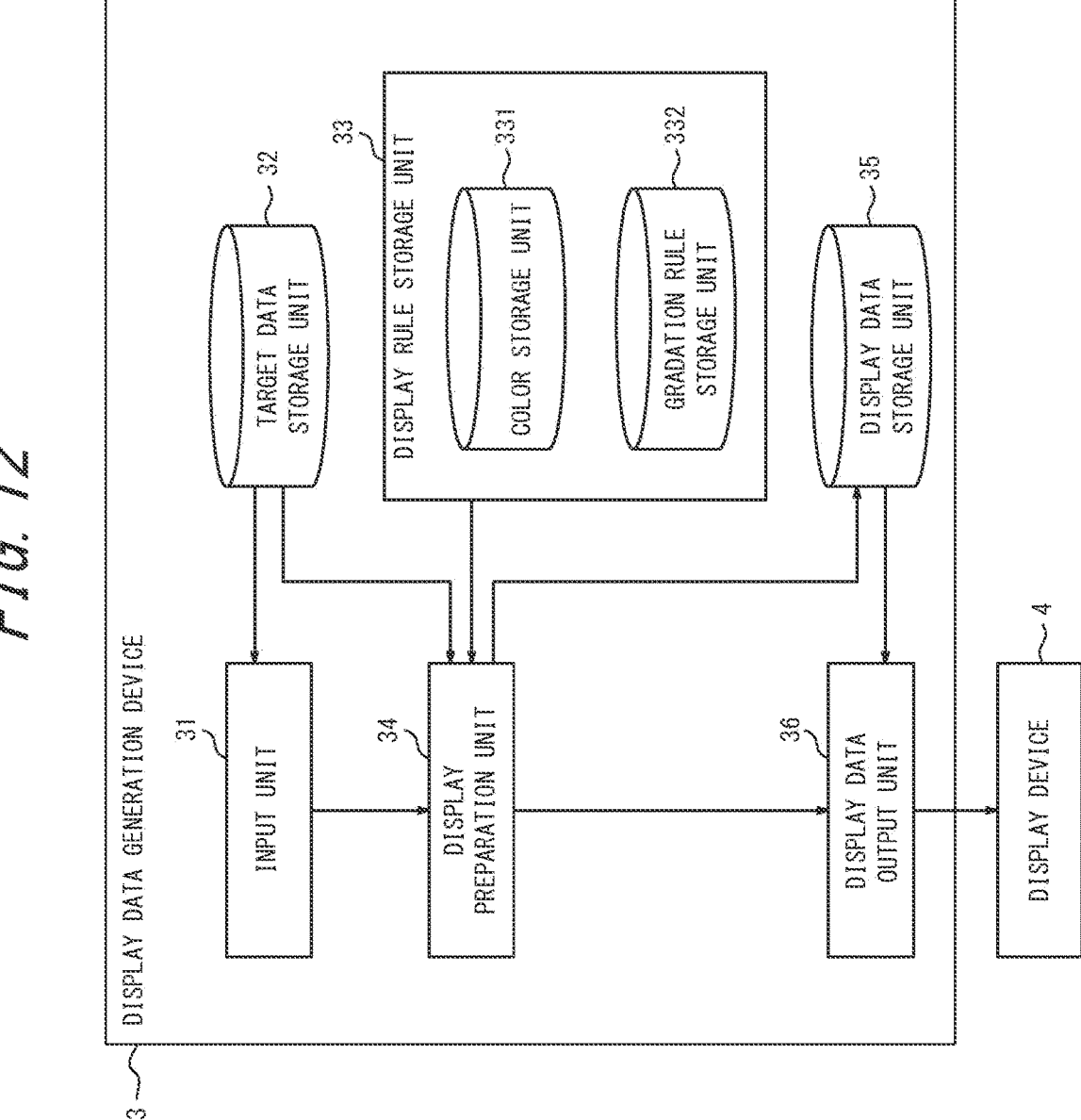
FIG. 12 is an overall schematic diagram of a display data generation device according to a third embodiment.

An overall configuration of a display data generation device 3 of a third embodiment will be described with reference to FIG. 12. FIG. 12 is a schematic diagram of the display data generation device 3 according to the present embodiment.

(Functional Configuration of Display Data Generation Device)

As illustrated in FIG. 12, the display data generation device 3 according to the third embodiment includes an input unit 31, a target data storage unit 32, a display rule storage unit 33, a display preparation unit 34, a display data storage unit 35, and a display data output unit 36. The input unit 31 includes an input interface that receives input of information similarly to the input unit 21 of the second embodiment. The target data storage unit 32, the display rule storage unit 33, and the display data storage unit 35 each include a memory similarly to the target data storage unit 22, the display rule storage unit 23, and the display data storage unit 25 of the second embodiment. Furthermore, the display preparation unit 34 and the display data output unit 36 are included in a control unit similarly to the display preparation unit 24 of the second embodiment.

The input unit 31 receives input of target data including utterance text sequences, annotation information corresponding to texts included in the utterance text sequences, and also accuracy indicating certainty of the annotation information as illustrated in FIG. 13. The target data may further include speaker information. The accuracy of topics may be determined by any algorithm for the utterance texts, or may be input by an operation by a user. Also in the third embodiment, the annotation information is topics to which the content of the utterance texts belongs, but is not limited thereto.

The target data storage unit 32 stores the target data input by the input unit 31.

The display rule storage unit 33 stores rules for the display preparation unit 34 to determine annotation expression information of the utterance texts on the basis of the annotation information. The display rule storage unit 33 includes a color storage unit 331 and a gradation rule storage unit 332. The color storage unit 331 is similar to the color storage unit 231 of the display data generation device 2 according to the second embodiment.

The gradation rule storage unit 332 stores gradation rules as illustrated in FIG. 14 for the display data output unit 36 to determine annotation expression information used for displaying utterance text related information and displaying the backgrounds of the information. The gradation rules in the third embodiment are gradations determined on the basis of the annotation information, sequences of the utterance texts, and accuracy of the annotation information.

Figure 15:
FIG. 15 is a diagram for describing in detail annotation expression information determined by the gradation rules illustrated in FIG. 14.

FIG. 15 is a diagram illustrating an example in which a gradation rule of "the last utterance text of a topic followed by a next topic" illustrated in FIG. 14 is applied in a case where the accuracy is 60%. "The last utterance text of a topic followed by a next topic" indicates that the topic of the utterance text is different from the topic of an utterance text uttered after the utterance text.

As illustrated in FIG. 15, in a case where an utterance text to be determined is "the last utterance text of a topic followed by a next topic", and the accuracy of the topic is not 100%, the annotation expression information is, when the percentage from the start point to the end point is 100%, a color corresponding to the topic from the start point to a position corresponding to the accuracy of the topic (position of 60% in the example of FIG. 15) and gradations in which the color changes from the color corresponding to the topic to white from the position toward the end point. Here, similarly to the second embodiment, the start point is an end portion on the start point side in an arrangement direction (direction from top to bottom in an example illustrated in FIG. 17 to be referred to below) (the end portion is upper end portion in the example illustrated in FIG. 17) in a column in which a topic is displayed (one utterance text) in a case where utterance included in the target data is displayed in the above arrangement direction in the utterance text sequences. The end point is an end portion on the end point side in the above arrangement direction (lower end portion in the example illustrated in FIG. 17) in a column in which a topic is displayed (one utterance text). Furthermore, in a case where an utterance text to be determined is "the last utterance text of a topic followed by a next topic" and the accuracy of the topic is 100%, the annotation expression information has a color corresponding to the topic and no gradations.

In the gradation rules of the example illustrated in FIG. 14, in a case where relationship between an utterance text to be determined and a topic associated with the utterance text is "the first utterance text of a topic that continues", and the accuracy of the topic is not 100%, the annotation expression information is gradations in which the color changes from white to a color corresponding to the topic from the start point toward a position corresponding to (100−the accuracy of the topic) %, and is the color corresponding to the topic from the position corresponding to (100−the accuracy of the topic) % to the end point. Note that "the first utterance text of a topic that continues" indicates that the topic of the utterance text is different from the topic of an utterance text uttered before the topic text. Furthermore, in a case where relationship between an utterance text to be determined and a topic associated with the utterance text is "the first utterance text of a topic that continues" and the accuracy of the topic is 100%, the annotation expression information has a color corresponding to the topic and no gradations.

Furthermore, in a case where relationship between an utterance text to be determined and a topic associated with the utterance text is "an utterance text in which the topics are switched in the middle", the annotation expression information is gradations in which the color changes from a color of a topic before switching to white from the start point toward a position corresponding to the accuracy of the topic, and is gradations in which the color changes from white to a color of a topic after the switching from the position corresponding to the accuracy of the topic toward the end point.

Furthermore, in a case where an utterance text to be determined does not satisfy any of the above conditions, the annotation expression information has a color of the topic of the utterance text from the start point to the end point and no gradations.

The display preparation unit 34 determines the annotation expression information such that background colors gradually change toward boundaries between sequences in the utterance text sequences having different annotation information. In the present embodiment, the display preparation unit 34 determines the annotation expression information further on the basis of the accuracy. The display preparation unit 34 may determine the annotation expression information indicating the degree of change in the background colors further on the basis of the accuracy. In the third embodiment, the annotation expression information is information indicating colors and gradations. At this time, the display preparation unit 34 may divide the utterance texts and determine annotation expression information on the basis of the divided utterance texts, the annotation information of the utterance texts, and the text sequences.

Specifically, first, the display preparation unit 34 divides the utterance texts included in the target data input by the input unit 11 similarly to the display preparation unit 24 of the second embodiment. Note that the display preparation unit 34 may not perform the processing of dividing the utterance texts similarly to the display preparation unit 24 of the second embodiment. In such a configuration, for example, the utterance texts included in the target data may be the divided utterance texts. Note that, in the example illustrated in FIG. 16, since the display preparation unit 34 does not divide the utterance texts, the utterance texts corresponding to determination unit IDs in display data are the same as the utterance texts corresponding to utterance IDs in the target data illustrated in FIG. 13.

The display preparation unit 34 determines colors and gradations corresponding to the utterance texts using color arrangement rules and the gradation rules. In the example in which the gradation rules illustrated in FIG. 14 are used, the display preparation unit 34 determines annotation expression information on the basis of annotation information of an utterance text and annotation information of utterance texts arranged before or after the utterance text in the utterance text sequences. Specifically, in a case where an utterance text to be determined is "the last utterance text of a topic followed by a next topic", and the accuracy of the topic is not 100%, the display preparation unit 34 determines that the annotation expression information is a color corresponding to the topic to the accuracy of the topic and gradations in which the color changes from the color corresponding to the topic to white from the accuracy of the topic.

Furthermore, in the example in which the gradation rules illustrated in FIG. 14 are used, in a case where an utterance text is "the first utterance text of a topic that continues", and the accuracy of the topic is not 100%, the display preparation unit 34 determines that the annotation expression information is a color corresponding to the topic to the accuracy of the topic and gradations in which the color changes from the color corresponding to the topic to white from the accuracy of the topic. Furthermore, in both of a case where an utterance text to be determined is "the last utterance text of a topic followed by a next topic" and a case where the utterance text to be determined is "the first utterance text of a topic that continues", the display preparation unit 34 determines that the annotation expression information has a color corresponding to the topic and no gradations as long as the accuracy of the topic is 100%.

Furthermore, in the example in which the gradation rules illustrated in FIG. 14 are used, in a case where an utterance text is "an utterance text in which the topics are switched in the middle", the display preparation unit 34 determines that the annotation expression information is gradations in which the color changes from a color of a topic before switching to white to the accuracy of the topic, and gradations in which the color changes from white to a color of a topic after the switching to white from the accuracy of the topic.

Furthermore, in the example in which the gradation rules illustrated in FIG. 14 are used, in a case where an utterance text to be determined does not satisfy any of the above conditions, the display preparation unit 34 determines that the annotation expression information has a color of the topic of the utterance text and no gradations.

Furthermore, upon determining annotation expression information of an utterance text, the display preparation unit 34 determines whether the annotation expression information of all the utterance texts has been determined. In a case of determining that annotation expression information of a part of the utterance texts has not been determined, the display preparation unit 34 repeats processing of determining annotation expression information of an utterance text for the utterance text for which the annotation expression information has not been determined. Furthermore, in a case of determining that all the utterance text annotation expression information has been determined, the display preparation unit 34 generates display data in which the utterance texts included in the target data are associated with the annotation expression information.

The display data storage unit 35 stores the display data generated by the display preparation unit 34.

The display data output unit 36 outputs the display data. The display data output unit 36 may output the display data to a display device 4 such as a liquid crystal panel or an organic EL, or may output the display data to another device via a communication network.

Accordingly, the display device 4 displays the display screen on the basis of the display data. Specifically, as illustrated in FIG. 17, the display device 4 displays the utterance texts included in the display data and the annotation information corresponding to the utterance texts in association with each other, and further displays the background colors of the annotation information using the color gradations as indicated by the annotation expression information included in the display data. Furthermore, the display device 4 may further cause the display device 4 to display one or more of the IDs and the speaker information in association with the utterance texts. Note that, in a case where the display data output unit 36 transmits the display data to another device via the communication network, the other device displays the display screen on the basis of the display data, similarly to the display device 4.

(Operation of Display Data Generation Device)

Figure 18:
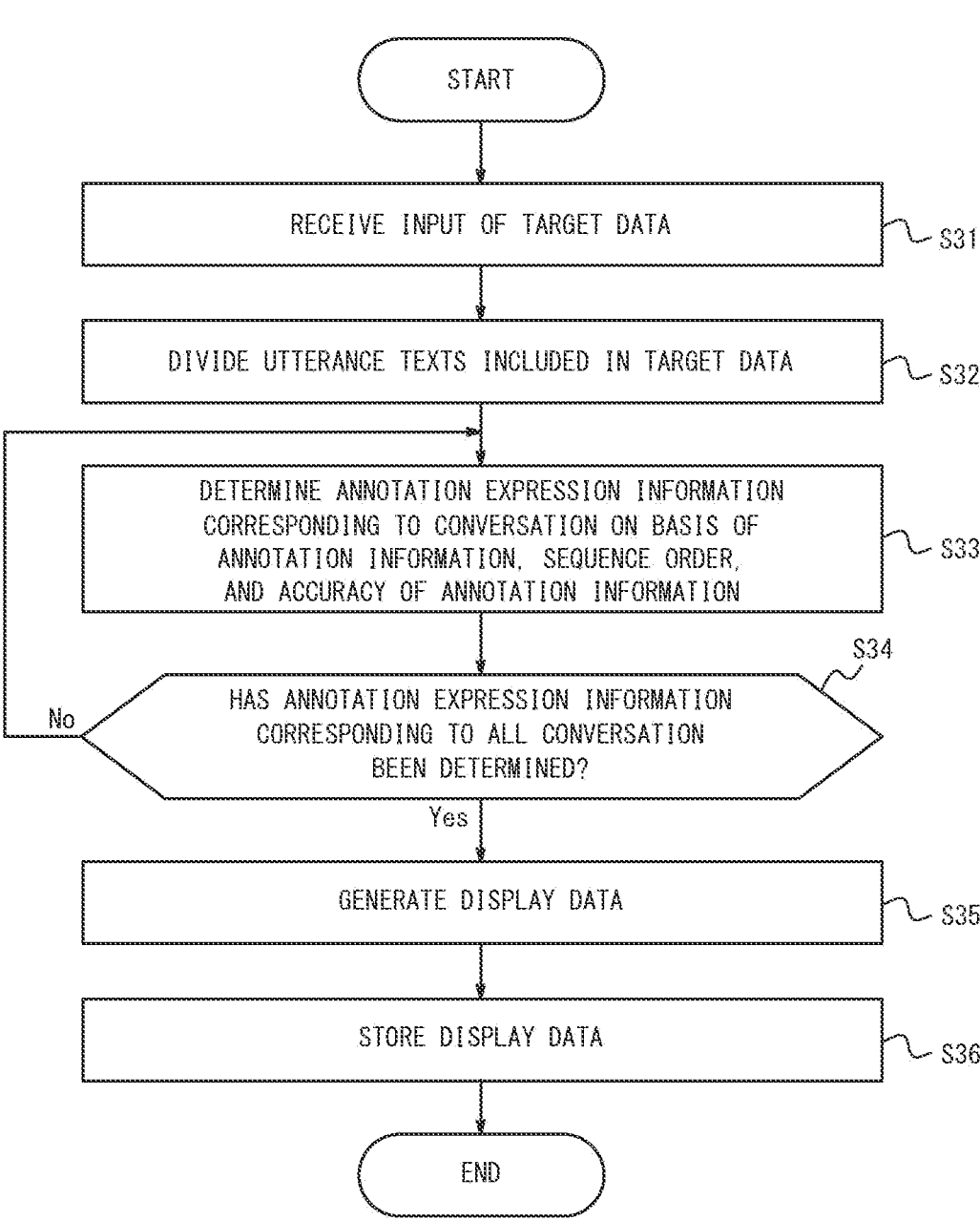
FIG. 18 is a flowchart illustrating an example of operation in the display data generation device illustrated in FIG. 12.

Here, operation of the display data generation device 3 according to the third embodiment will be described with reference to FIG. 18. FIG. 18 is a flowchart illustrating an example of the operation in the display data generation device 3 according to the third embodiment. The operation in the display data generation device 3 described with reference to FIG. 18 corresponds to a display method of the display data generation device 3 according to the third embodiment.

In step S31, the input unit 31 receives input of target data including utterance text sequences, annotation information corresponding to utterance texts included in the utterance text sequences, and the accuracy of the annotation information.

In step S32, the display preparation unit 34 divides the utterance texts included in the target data input by the input unit 31.

In step S33, the display preparation unit 34, further on the basis of the accuracy of the annotation information in addition to the annotation information and a sequence order, determines annotation expression information indicating a background color of the display screen of the display device 4 and a position and range in which the background color is displayed for expressing correspondence relationship between the utterance texts and the annotation information in a case where the display device 4 displays the utterance texts. Specifically, in the present example, the display preparation unit 24 determines the annotation expression information indicating the color and gradations corresponding to utterance texts.

In step S34, the display preparation unit 34 determines whether annotation expression information of all the utterance texts has been determined.

In a case of determining that annotation expression information of a part of the utterance texts has not been determined in step S34, the processing returns to step S33, and the display preparation unit 34 repeats the processing. Furthermore, in a case of determining that the annotation expression information of all the utterance texts has been determined in step S34, the display preparation unit 34, in step S35, generates display data for causing the utterance text sequences and the annotation information to be displayed according to sequences in the utterance text sequences, the display data being for causing background colors indicated by the annotation expression information to be displayed at positions and ranges indicated by the annotation expression information.

In step S36, the display data storage unit 35 stores the display data.

Thereafter, the display data output unit 36 outputs the display data at any timing. The display data output unit 36 may output the display data to the display device 4, or may output the display data to another device via the communication network. The any timing can be, for example, timing at which a display command is input to the input unit 31. Accordingly, the display device 4 displays the display screen on the basis of the display data. Specifically, the display device 4 displays the utterance texts and the annotation information on the basis of the display data, and displays the background colors indicated by the annotation expression information at the positions and ranges indicated by the annotation expression information.

Note that, in the above description, the display data generation device 3 performs processing of step S32, but the present invention is not limited thereto. For example, the display data generation device 3 may not perform the processing of step S32.

As described above, according to the third embodiment, target data further includes the accuracy indicating the certainty of annotation information, and the display preparation unit 34 determines annotation expression information further on the basis of the accuracy. As a result, a user can recognize that the annotation information corresponding to utterance texts is annotation information corresponding to colors, and recognize that the annotation information may be annotation information that does not correspond to the colors. Furthermore, a user can intuitively grasp the certainty that the annotation information corresponding to the utterance texts is the annotation information corresponding to the colors. Therefore, a user can more quickly and appropriately recognize the content of the target data including the utterance texts.

Note that, in the second embodiment described above, the display data generation device 2 displays utterance texts uttered by a plurality of speakers in the same column, but the present invention is not limited thereto. For example, as illustrated in FIG. 19, the display data generation device 3 causes utterance texts uttered by one speaker and utterance texts uttered by the other speaker to be displayed in different columns, causes annotation information to be displayed in rows in which utterance texts are displayed, and causes gradations to be displayed in the backgrounds of the annotation information. In the example illustrated in FIG. 19, the display data generation device 2 causes the display device 4 to display the utterance texts such that the utterance texts are arranged in utterance text sequences from the top of the screen to the bottom. With respect to target data of the present example, an utterance text corresponding to an utterance ID "9" of "Yes, I am okay." is uttered by a customer substantially simultaneously with an utterance text corresponding to an utterance ID "8" of "Are you okay?" is uttered by an operator in the conversation. In such a case, in the example illustrated in FIG. 10, one of utterance texts simultaneously uttered by a plurality of speakers is displayed first, and the other is displayed below. On the other hand, in the example illustrated in FIG. 19, since the target data includes time when the utterance texts are uttered, the display data generation device 2 can display utterance texts uttered by a plurality of speakers substantially simultaneously in the same row on the basis of the time included in the target data. As a result, a user can clearly understand that a plurality of utterance texts by a plurality of speakers are simultaneously uttered. Therefore, a user who refers to the utterance texts based on the target data displayed by the display data generation device 2 can easily grasp the utterance texts uttered by each of the speakers, and can efficiently recognize the content of the target data. Furthermore, the same applies to the display data generation device 1 according to the first embodiment and the display data generation device 3 according to the third embodiment.

Furthermore, the display preparation unit 24 of the display data generation device 2 may further determine important utterance texts among a plurality of utterance texts. The display preparation unit 24 can determine the important utterance texts by any algorithm. For example, the display data generation device 2 may perform determination using a model generated in advance by performing learning on the basis of a large amount of important utterance texts, or may store important words and phrases in advance in a memory and determine that utterance texts including the words and phrases stored in the memory as important utterance texts. Furthermore, the display preparation unit 24 may determine important utterance texts on the basis of an operation by a user. In such a configuration, as illustrated in FIG. 20, the display data output unit 26 causes the display device 4 to display utterance texts determined to be the important utterance texts with the utterance texts being highlighted. For example, the display data generation device 2 may cause the display device 4 to display characters indicating utterance text determined not to be the important utterance texts (other utterance texts) in black, and may cause the display device 4 to display characters indicating the utterance texts determined to be the important utterance texts in a color different from that of the other utterance texts (for example, red). Note that, in the example illustrated in FIG. 20, the important utterance texts are indicated by bold letters, but the highlight is not limited thereto. As a result, a user can easily grasp the important utterance texts, and can efficiently recognize the content of the target data. Furthermore, the same applies to the display data generation device 1 according to the first embodiment and the display data generation device 3 according to the third embodiment.

Furthermore, as illustrated in FIG. 21, the display data output unit 26 of the display data generation device 2 may also display only the utterance texts determined to be the important utterance texts without displaying the utterance texts determined not to be the important utterance texts. As a result, a user can more easily grasp the important utterance texts, and can more efficiently recognize the content of the target data. Furthermore, in such a configuration, the display data output unit 26 may switch between the state of displaying the other utterance texts and the state of not displaying the other utterance texts by an operation of a user. For example, in a case where a user determines that the target data cannot entirely be understood because the other utterance texts are not displayed, the user can perform an operation for displaying the other utterance texts and try to understand the entire target data with reference to the other utterance texts. Furthermore, the same applies to the display data generation device 1 according to the first embodiment and the display data generation device 3 according to the third embodiment.

Figure 22:
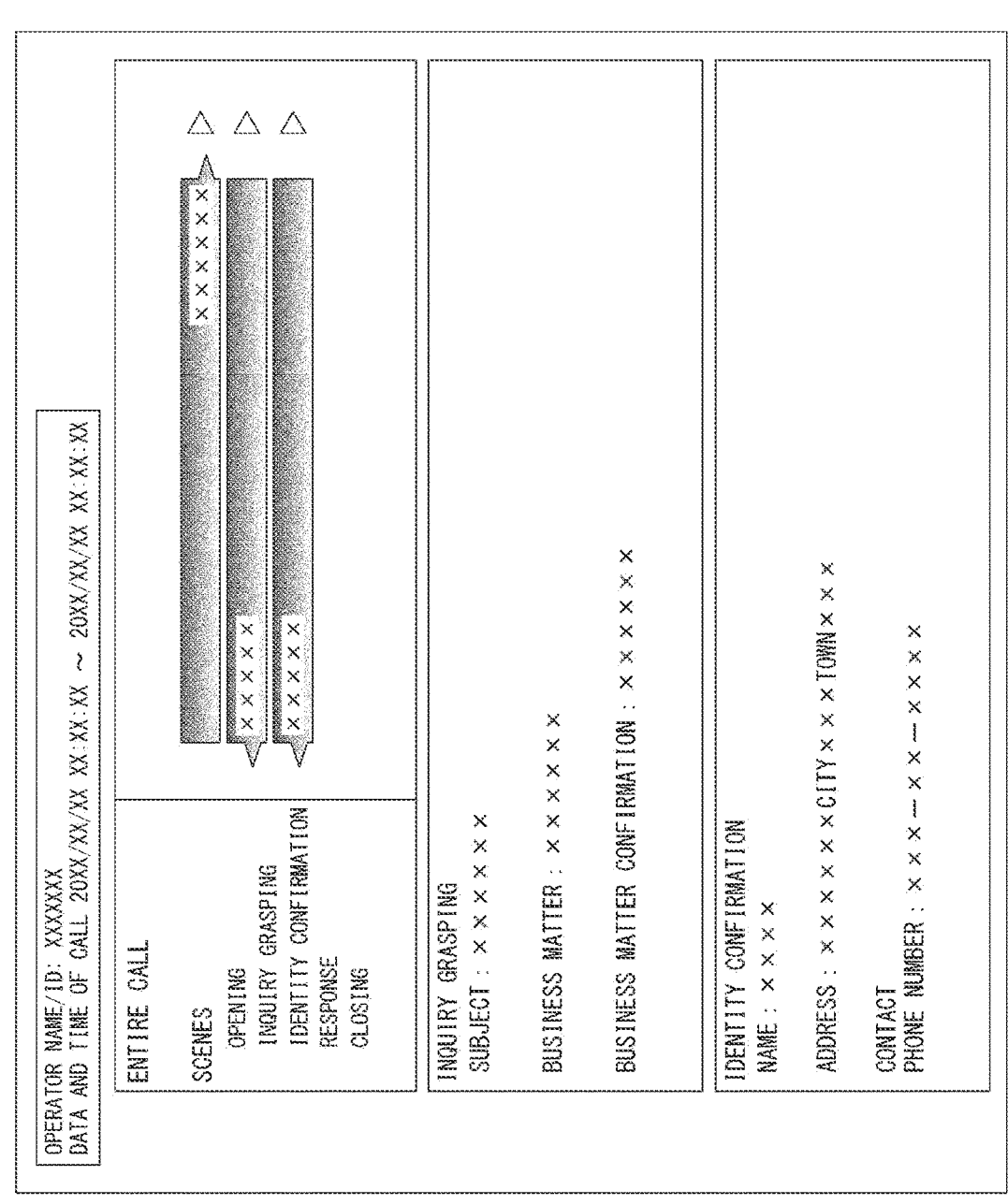
FIG. 22 is an example of a screen displayed by a fourth modification of the display data output unit illustrated in FIG. 7.

Furthermore, in the second embodiment described above, the annotation information is topics, but the present invention is not limited thereto. As illustrated in FIG. 22, the annotation information may be "scenes" indicating occasions where utterance texts are uttered. In the present example, a "scene" is obtained by classifying an utterance text according to a type of the occasion in conversation between an operator and a customer. For example, a "scene" is obtained by classifying a flow in which the operator firstly says his/her own name, the customer talks about a business matter in calling, the operator confirms the business matter, confirms a contractor and contract content, then responds to the business matter, finally expresses gratitude, and ends the conversation into occasions including "opening", "inquiry grasping", "response", "closing", and the like. Such an estimation result of a scene is given as a label to an utterance text.

For example, in an inbound type call center in which an operator receives calls from customers, items may include "opening", "inquiry grasping", "identity confirmation", "response", and "closing". Furthermore, the display data output unit 26 of the display data generation device 2 may display the utterance texts included in the target data, and cause the display device 4 to display the backgrounds of the utterance texts that are portions related to information using color gradations. That is, in the present example, the portions related to the information are the backgrounds of the utterance texts. Furthermore, the display data output unit 26 may cause the display device 4 to display an "entire call" button and buttons indicating the respective items included in the scenes that are the annotation information.

In such a configuration, when any button is operated by an operation by a user, information indicating that the operation has been performed is received by the input unit 21, and the display device 4 displays utterance texts on the basis of the information.

For example, when the "entire call" button is pressed by an operation by a user, the input unit 21 receives information indicating the pressing of the "entire call" button. Then, the display device 4 displays the entire utterance texts included in the target data on the basis of the information. Furthermore, when an "opening" button is pressed by an operation by a user, the input unit 21 receives information indicating the pressing of the "opening" button. Then, the display device 4 displays utterance texts having a scene of "opening" included in the target data on the basis of the information.

Furthermore, when an "inquiry grasping" button is pressed by an operation by a user, the display device 4 may display detailed information related to "inquiry grasping". The detailed information related to "inquiry grasping" can include at least one of "subject", "business matter", or "business matter confirmation" generated by any algorithm on the basis of utterance texts corresponding to a scene of "inquiry grasping". The display device 4 may display operation objects for performing operations for changing "subject", "business matter", and "business matter confirmation" together with "business matter" and "business matter confirmation". Note that the display device 4 may display the detailed information related to "inquiry grasping" also in a case where the "entire call" button is pressed by an operation by a user.

Furthermore, when an "identity confirmation" button is pressed by an operation by a user, the display device 4 may display detailed information related to "identity confirmation". The detailed information related to "identity confirmation" can include at least one of "name", "address", or "phone number" of a customer generated by any algorithm on the basis of utterance texts corresponding to a scene of "identity confirmation". The display data output unit 26 may cause the display device 4 to display operation objects for performing operations for changing "name", "address", and "phone number" together with "name", "address", and "phone number". Note that the display data output unit 26 may cause the display device 4 to display the detailed information related to "identity confirmation" also in a case where the "entire call" button is pressed by an operation by a user.

Furthermore, the display device 4 may display time zones in which the utterance texts included in the target data are uttered along with the display of the utterance texts included in the target data. Furthermore, the display device 4 may display voice reproduction buttons for reproducing voice data corresponding to the utterance texts (arrows indicated by triangles in FIG. 22) in the vicinities of the utterance texts. In such a configuration, the display data generation device 2 reproduces voice data when a voice reproduction button is pressed by a user.

Note that the display data generation device 1 according to the first embodiment and the display data generation device 3 according to the third embodiment can similarly perform the aspect described with reference to FIG. 22.

Figure 23:
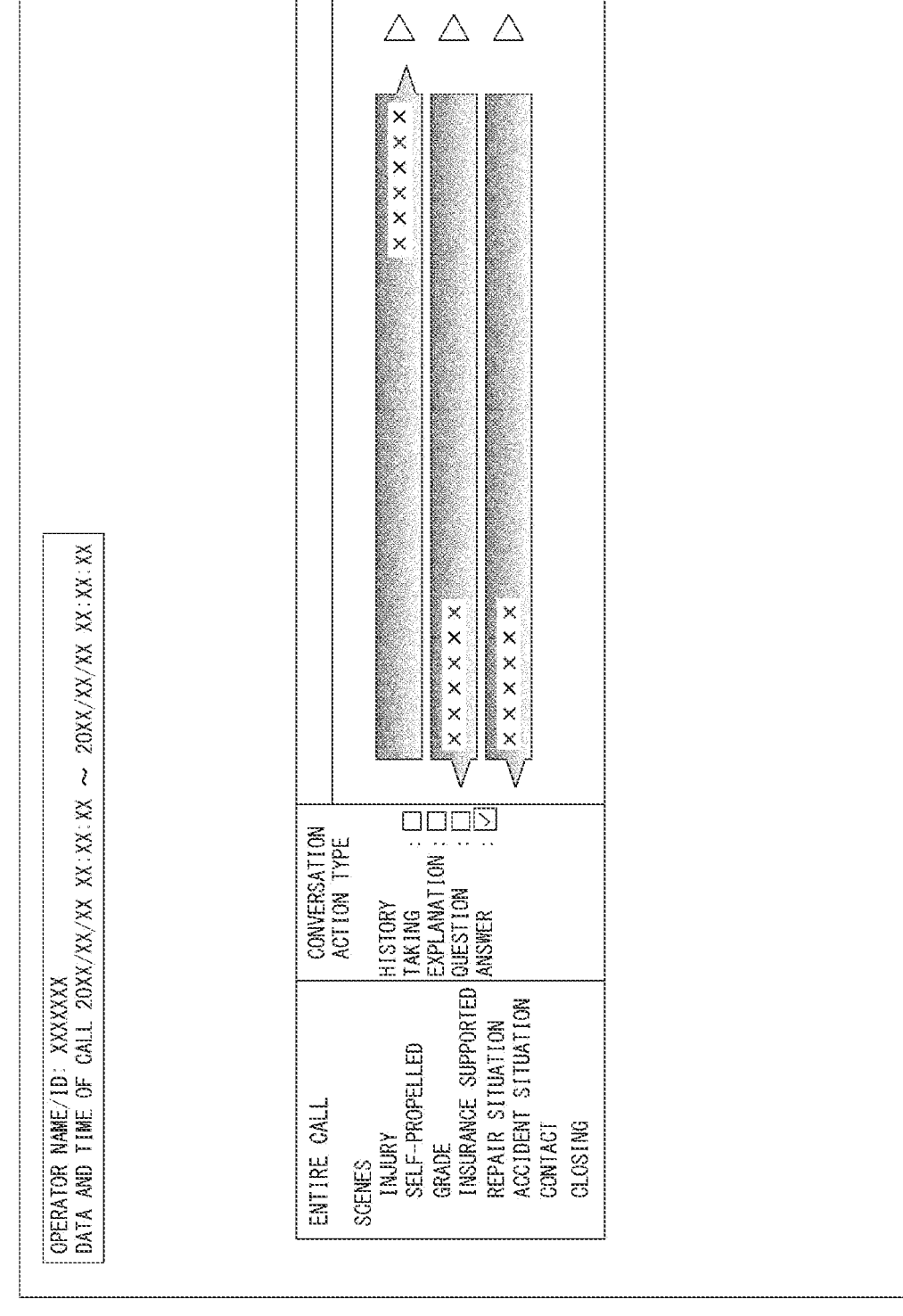
FIG. 23 is an example of a screen displayed by a fifth modification of the display data output unit illustrated in FIG. 7.

In the aspect described with reference to FIG. 22, the annotation information is "scenes", but as illustrated in FIG. 23, the annotation information may be both "scenes" and "conversation action types" indicating the types of actions when the utterance texts are uttered. For example, in an outbound type of call center in which an operator calls customers, "scenes" may include "opening", "injury", "self-propelled", "grade", "insurance supported", "repair situation", "accident situation", "contact", and "closing". Furthermore, the display device 4 to which the display data is output from the display data generation device 2 may display background colors of the utterance texts included in the target data using gradations. Furthermore, in the present example, the "conversation action types" may include "history taking", "explanation", "question", and "answer". "History taking" is an utterance text in which an operator is performing hearing for a customer, "explanation" is an utterance text in which the operator is explaining to the customer, "question" is an utterance text in which the customer is asking a question to the operator, and "answer" is an utterance text in which the customer is answering for the hearing by the operator.

The display device 4 may display the "entire call" button, the buttons indicating the respective items included in the "scenes" that are the annotation information, and buttons indicating respective items included in the "conversation action types" that are the annotation information. In such a configuration, when any button is operated by an operation by a user, information indicating that the operation has been performed is received by the input unit 21, and the display device 4 displays utterance texts on the basis of the information. Note that, in the present example, the buttons indicating the respective items included in the "conversation action types" are formed by checkbox buttons so that one or two or more buttons can be selected, but the buttons are not limited thereto, and buttons of any aspect can be appropriately adopted. In the example illustrated in FIG. 23, an "answer" button is checked, and only utterance texts in which the "conversation action type" is associated with "answer" are displayed as the annotation information.

Furthermore, similarly to the aspect described with reference to FIG. 22, the display device 4 may display speaker information and time zones in which the utterance texts included in the target data are uttered along with the display of the utterance texts included in the target data. Furthermore, the display device 4 may cause voice reproduction buttons for reproducing voice data corresponding to the utterance texts (arrows indicated by triangles in FIG. 23) to be displayed in the vicinities of portions where the utterance texts are displayed. In such a configuration, the display data generation device 2 reproduces voice data when a voice reproduction button is pressed by a user.

Note that the display data generation device 1 according to the first embodiment and the display data generation device 3 according to the third embodiment can similarly perform the aspect described with reference to FIG. 23.

Furthermore, in the second embodiment described above, the colors corresponding to the annotation information stored in the color storage unit 331 are different from each other, but the present invention is not limited thereto, and the colors corresponding to the annotation information may be the same as each other. Even in such a configuration, the display data output unit 36 can cause the display device 4 to display the backgrounds using color gradations on the basis of the annotation expression information indicating the colors and gradations generated by the display preparation unit 34 on the basis of the gradation rules stored in the gradation rule storage unit 232. Therefore, a user can recognize that a topic corresponding to an utterance text group is not one but a plurality of topics can be interpreted. Furthermore, in such a configuration, since the display data generation device 2 does not need to include the color storage unit 231, the memory capacity can be reduced. Note that the same applies to the third embodiment.

Furthermore, the display aspect, the gradation rules, and the like described in first to third embodiments are examples, and the present invention is not limited thereto. Furthermore, the display data generation devices 1 to 3 according to the first to third embodiments may further include various functions used when an operator creates a reception history. For example, the display data generation devices 1 to 3 may further include a function of displaying utterance texts for each topic, a function of editing utterance texts and topics, a search function of searching for utterance texts, a comparison function of comparing target data, and the like.

<Table Data Generation Program>

Figure 24:
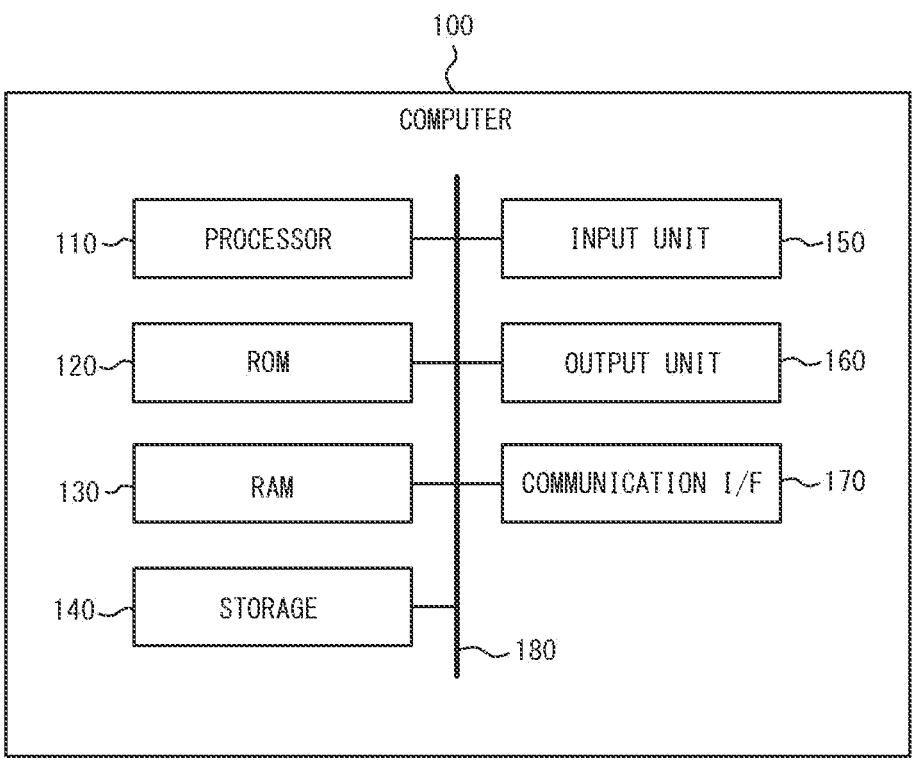
FIG. 24 is a hardware block diagram of the display data generation device.

A computer 100 capable of executing each program instruction can also be used to function as the above the display data generation device 1. FIG. 24 is a block diagram illustrating a schematic configuration of the computer 100 that each functions as the display data generation device 1. Here, the computer 100 may be a general-purpose computer, a dedicated computer, a workstation, a personal computer (PC), an electronic note pad, or the like. The program command may be a program code, code segment, or the like for executing a necessary task. Similarly, the computer 100 capable of executing each program instruction can be used to function as the display data generation device 2, and the computer 100 capable of executing each program instruction can be used to function as the display data generation device 3.

<Hardware Configuration>

As illustrated in FIG. 24, the computer 100 includes a processor 110, a read only memory (ROM) 120, a random access memory (RAM) 130, a storage 140, an input unit 150, an output unit 160, and a communication interface (I/F) 170. The configurations are communicably connected to each other via a bus 180. Specifically, the processor 110 is a central processing unit (CPU), a micro processing unit (MPU), a graphics processing unit (GPU), a digital signal processor (DSP), a system on a chip (SoC), or the like and may be configured by the same or different types of plurality of processors.

The processor 110 executes control of the configurations and various types of arithmetic processing. That is, the processor 110 reads a program from the ROM 120 or the storage 140 and executes the program by using the RAM 130 as a working area. The processor 110 executes control of the above configurations and various types of arithmetic processing according to a program stored in the ROM 120 or the storage 140. In the present embodiment, a program according to the present disclosure is stored in the ROM 120 or the storage 140.

The program may be recorded in a recording medium that can be read by the computer 100. When such a recording medium is used, the program can be installed in the computer 100. Here, the recording medium on which the program is recorded may be a non-transitory recording medium. The non-transitory recording medium may be, for example, a CD-ROM, a DVD-ROM, a universal serial bus (USB) memory, or the like, but the non-transitory recording medium is not particularly limited thereto. The program may be downloaded from an external device via a network.

The ROM 120 stores various programs and various types of data. The RAM 130 temporarily stores a program or data as a working area. The storage 140 includes a hard disk drive (HDD) or a solid state drive (SSD) and stores various programs including an operating system and various types of data.

The input unit 150 includes one or more input interfaces that receive a user's input operation and acquire information based on the user's operation. For example, the input unit 150 is a pointing device, a keyboard, a mouse, or the like, but is not limited thereto.

The output unit 160 includes one or more output interfaces that output information. For example, the output unit 160 controls a display that outputs information as a video or a speaker that outputs information as an audio, but the present invention is not limited thereto.

The communication interface 170 is an interface for communicating with another device such as an external device, and for example, standards such as Ethernet (registered trademark), FDDI, and Wi-Fi (registered trademark) are used.

Regarding the above embodiments, the following supplementary notes are further disclosed.
(Supplement 1)

A display data generation device including a control unit, in which the control unit receives input of target data including a text sequence and annotation information corresponding to texts included in the text sequence, determines, on the basis of the annotation information, annotation expression information indicating a background color of a display screen of a display device and a position and a range in which a corresponding background color is displayed for expressing correspondence relationship between the texts and the annotation information in a case where the display device displays the texts, and generates display data for causing the text sequence and the annotation information to be displayed according to a sequence in the text sequence, the display data being for causing the background color indicated by the annotation expression information to be displayed at the position and the range indicated by the annotation expression information.

(Supplement 2)

The display data generation device according to the supplement 1, in which the control unit determines the annotation expression information such that the background color gradually changes toward a boundary between sequences in the text sequence having the annotation information that is different.
(Supplement 3)

The display data generation device according to the supplement 2, in which the target data further includes accuracy indicating certainty of the annotation information, and the control unit determines the annotation expression information further on the basis of the accuracy.
(Supplement 4)

The display data generation device according to the supplement 3, in which the control unit determines the annotation expression information indicating degree of change in the background color further on the basis of the accuracy.
(Supplement 5)

The display data generation device according to any one of supplements 1 to 4, in which the control unit divides the utterance texts and determines the annotation expression information of the divided utterance texts.
(Supplement 6)

The display data generation device according to any one of supplements 1 to 5, in which the display data includes the annotation information, and a position and a range in which the background color is displayed include a display position and a display range of the annotation information, respectively.
(Supplement 7)

A display data generation method including a step for receiving input of target data including a text sequence and annotation information corresponding to texts included in the text sequence, and a step for determining, on the basis of the annotation information, annotation expression information indicating a background color of a display screen of a display device and a position and a range in which a corresponding background color is displayed for expressing correspondence relationship between the texts and the annotation information in a case where the display device displays the texts, and generating display data for causing the text sequence and the annotation information to be displayed according to a sequence in the text sequence, the display data being for causing the background color indicated by the annotation expression information to be displayed at the position and the range indicated by the annotation expression information.
(Supplement 8)

A non-transitory storage medium that stores a program that can be executed by a computer, the non-transitory storage medium causing the computer to function as the display data generation device according to any one of supplements 1 to 6.

All documents, patent applications, and technical standards described in this specification are incorporated herein by reference to the same extent as if each individual document, patent application, and technical standard were specifically and individually described to be incorporated by reference.

Although the above-described embodiments have been described as representative examples, it is apparent to those skilled in the art that many modifications and substitutions can be made within the spirit and scope of the present disclosure. Accordingly, it should not be understood that the present invention is limited by the above-described embodiments, and various modifications or changes can be made within the scope of the claims. For example, a plurality of configuration blocks illustrated in the configuration diagrams of the embodiments can be combined into one, or one configuration block can be divided.

REFERENCE SIGNS LIST 1,2,3 Display data generation device
4 Display device
11,21,31 Input unit
12, 22, 32 Target data storage unit
13, 23, 33 Display rule storage unit
14, 24, 34 Display preparation unit
15, 25, 35 Display data storage unit
16, 26, 36 Display data output unit
131, 231, 331 Color storage unit
232, 332 Gradation rule storage unit
100 Computer
110 Processor
120 ROM
130 RAM
140 Storage
150 Input unit
160 Output unit
180 Bus

The invention claimed is:

1. A display data generation apparatus comprising processing circuitry configured to:
   receive input of target data including:
      a text sequence including texts, the texts being utterances that have occurred in chronological order or being arranged in sentences in arrangement order; and
      annotation information for each of the texts included in the text sequence;
   determine, depending on the annotation information for each of the texts, annotation expression information corresponding to each of the texts, the annotation expression information indicating how a display apparatus displays the texts; and
   generate display data for causing the annotation information for each of the texts to be displayed according to the determined annotation expression information.

2. The display data generation apparatus according to claim 1,
   wherein the annotation expression information indicates a background to be displayed at a position and a range of a display screen of the display apparatus that correspond to each of the texts when the display apparatus displays the texts.

3. The display data generation apparatus according to claim 2,
   wherein the processing circuitry is configured to determine the background gradually changing toward a boundary between sequences in the text sequence having different annotation information.

4. The display data generation apparatus according to claim 3,
   wherein the target data further includes accuracy indicating certainty of the annotation information, and
   the processing circuitry is configured to determine the background further on a basis of the accuracy.

5. The display data generation apparatus according to claim 4,
   wherein the processing circuitry is configured to determine a degree of change in the background further on a basis of the accuracy.

6. The display data generation apparatus according to claim 1,
   wherein the processing circuitry is configured to divide the texts and determine the annotation expression information corresponding to the divided texts.

7. The display data generation apparatus according to claim 2,
   wherein the display data includes the annotation information, and
   a position and a range in which the background is displayed include a display position and a display range of the annotation information, respectively.

8. A computer-readable non-transitory recording medium storing computer-executable program instructions that when executed by a processor cause a computer system to execute operations of the display data generation apparatus according to claim 1.

9. The display data generation apparatus according to claim 2,
   wherein the target data further includes a sequence order being the chronological order or the arrangement order,
   the annotation information includes a classification label for each of the texts,
   the background includes a background color, and
   the processing circuitry is configured to generate, as the display data, data for causing the texts and the classification label for each of the texts to be displayed according to the sequence order.

10. The display data generation apparatus according to claim 9,
   wherein the processing circuitry is configured to determine the background color gradually changing toward a boundary between sequences in the text sequence having different classification labels.

11. The display data generation apparatus according to claim 10,
   wherein the target data further includes accuracy indicating certainty of the classification label, and
   the processing circuitry is configured to determine the background color further on a basis of the accuracy.

12. The display data generation apparatus according to claim 11,
   wherein the processing circuitry is configured to determine a degree of change in the background color further on a basis of the accuracy.

13. The display data generation apparatus according to claim 9,
   wherein the processing circuitry is configured to divide the texts and determine the background color of the divided texts.

14. The display data generation apparatus according to claim 9,
   wherein the display data includes the classification label, and
   a position and a range in which the background color is displayed include a display position and a display range of the classification label, respectively.

15. A display data generation method comprising:

receiving input of target data including:

a text sequence including texts, the texts being utterances that have occurred in chronological order or being arranged in sentences in arrangement order; and annotation information for each of the texts included in the text sequence;

determining, depending on the annotation information for each of the texts, annotation expression information corresponding to each of the texts, the annotation expression information indicating how a display apparatus displays the texts; and generating display data for causing the annotation information for each of the texts to be displayed according to the determined annotation expression information.

16. The display data generation method according to claim 15, wherein the annotation expression information indicates a background to be displayed at a position and a range of a display screen of the display apparatus that correspond to each of the texts when the display apparatus displays the texts.

17. The display data generation method according to claim 16, wherein the target data further includes a sequence order being the chronological order or the arrangement order, the annotation information includes a classification label for each of the texts, the background includes a background color, and the generating generates, as the display data, data for causing the texts and the classification label for each of the texts to be displayed according to the sequence order.

* * * * *